(12) United States Patent
Halstead et al.

(10) Patent No.: US 11,593,339 B2
(45) Date of Patent: Feb. 28, 2023

(54) SYSTEMS AND METHODS FOR DETERMINING DATASET INTERSECTION

(71) Applicant: Infosum Limited, Basingstoke (GB)

(72) Inventors: Nicholas Halstead, Hook (GB); Eike Spang, Basingstoke (GB)

(73) Assignee: Infosum Limited, Basingstoke (GB)

( * ) Notice: Subject to any disclaimer, the term of this patent is extended or adjusted under 35 U.S.C. 154(b) by 28 days.

(21) Appl. No.: 16/638,240

(22) PCT Filed: Aug. 10, 2018

(86) PCT No.: PCT/EP2018/071828
§ 371 (c)(1),
(2) Date: Feb. 11, 2020

(87) PCT Pub. No.: WO2019/030408
PCT Pub. Date: Feb. 14, 2019

(65) Prior Publication Data
US 2020/0250164 A1    Aug. 6, 2020

(30) Foreign Application Priority Data
Aug. 11, 2017 (GB) .................................. 1712946

(51) Int. Cl.
*G06F 16/22* (2019.01)
*G06F 16/2455* (2019.01)
*G06F 16/27* (2019.01)

(52) U.S. Cl.
CPC .... *G06F 16/2272* (2019.01); *G06F 16/24558* (2019.01); *G06F 16/27* (2019.01)

(58) Field of Classification Search
CPC .......................... G06F 16/2272; G06F 16/2291
(Continued)

(56) References Cited

U.S. PATENT DOCUMENTS 9,378,382 B1    6/2016 Swamidass
10,362,105 B1 * 7/2019 DeMarco ............ H04L 67/1095
(Continued)

FOREIGN PATENT DOCUMENTS

EP    2547033    1/2013

OTHER PUBLICATIONS

Tong, et al.; "A Shifting Bloom Filter Framework for Set Queries", Proceedings of the VLDB Endowment, [Onling] vol. 9, No. 5, Jan. 1, 2016 (Jan. 1, 2016), pp. 408-419, XP055867332, New York, NY, ISSN: 2150-8097, DOI: 10.14778/2876473.2876476 Retrieved from the Internet: URL: http://people.engr.ncsu.edu/mshahza/publications/VLDB2016SetQueries.pdf [retrieved on Nov. 30, 2021].

*Primary Examiner* — Syling Yen
(74) *Attorney, Agent, or Firm* — BainwoodHuang

(57) ABSTRACT

A method of determining an indication of an intersection between a first dataset and a second dataset, the first and second datasets each holding entries in association with at least one key, the method comprising: generating for the at least one key in the first dataset location information in a first binary structure by applying a deterministic function to the entries associated with the key; transmitting the first binary structure to a comparison stage; generating for the at least one key in the second dataset, location information in a second binary structure by applying the same deterministic function to the entries associated with the key; and comparing, at the comparison stage, the location information in the first and second binary structures to determine the indication of the intersection between the first dataset and second dataset.

20 Claims, 23 Drawing Sheets

(58) Field of Classification Search
USPC .......................................................... 707/758
See application file for complete search history.

(56) References Cited

U.S. PATENT DOCUMENTS

| | | | |
|---|---|---|---|
| 2011/0099187 A1* | 4/2011 | Hansen | G06F 16/9014 |
| | | | 707/769 |
| 2013/0010950 A1* | 1/2013 | Kerschbaum | H04L 9/008 |
| | | | 380/30 |
| 2014/0280037 A1* | 9/2014 | Petride | G06F 16/24542 |
| | | | 707/719 |
| 2015/0242407 A1 | 8/2015 | Frohock et al. | |
| 2015/0324410 A1* | 11/2015 | Glover | G06F 16/9024 |
| | | | 707/610 |
| 2016/0179894 A1* | 6/2016 | Gupta | G06F 16/2456 |
| | | | 707/714 |
| 2018/0074786 A1* | 3/2018 | Oberbreckling | G06F 16/25 |
| 2018/0081585 A1* | 3/2018 | Piga | G06F 3/0647 |
| 2019/0018889 A1* | 1/2019 | Colgrove | G06F 16/2456 |

\* cited by examiner

```
columns:
  hashed_pid: BYTES
  debt: UINT64
  storecard_balance: INT64
  credit_score: DOUBLE
  have_life_insurance: BOOLEAN
  number_of_credit_cards: UINT64
  address_1: TEXT
  address_2: TEXT
  address_3: TEXT
  post_code: TEXT
keys:
  - hashed_pid
credentials:
  user: dev
  password: dev
  database: database1
  address: 192.168.1.130:3306
redaction_threshold: 1000
bin_redaction_threshold: 100
max_database_connections: 151
store: mysql
executors: 4
```
~56

FIG. 7a

SYSTEMS AND METHODS FOR DETERMINING DATASET INTERSECTION

FIELD

The present invention relates to accessing databases, and particularly but not exclusively to accessing multiple independent databases to provide a response to a single query having multiple expressions.

BACKGROUND

It has long been the case that it has been possible to query databases holding data to provide a response to the query. Queries are run on databases to find a match for the information being requested responsive to the query. For example, a user providing the query might want to know how many entries in a particular database satisfy a particular requirement, for example, an age range or gender requirement. There are numerous technologies available to handle this. It is becoming an increasing requirement however to use more than one database to satisfy a single query. This can be for multiple reasons. It may be advantageous to access more than one data set due to the extra information that can be gained in doing so. Queries may be more complex, and have more expressions requiring a match. Some expressions may be fulfilled by one database, whereas other expressions may relate to information or data held in a different database. Existing techniques for satisfying a query with multiple expressions where those expressions need to be fulfilled from different databases are not wholly satisfactory.

According to one technique, the two independent datasets are firstly merged together so that they exist as a single dataset which can then be queried with the multiple expressions. This procedure can require the transfer of large amounts of data, and a complex merging exercise at the receiving end.

Sometimes, databases are available within a single "system" such that they can be in direct communication. A technique exists to query across such databases. For this technique you have to give full read access to the databases to allow those queries. So there is no way of controlling the queries that are made on individual databases and therefore there is no way to keep the data secure. This is why the technique is only suitable for databases which are held on the same "system". The technique is not suitable for databases held by independent owners.

Thus, in one known arrangement, data is collected into a single database. This puts limitations on how the data can be joined and analysed. In another technique, data is moved either physically or over the Internet, exposing it to a variety of security risks.

Further disadvantages of the known techniques include the fact that data quickly becomes less valuable and useful as it goes out of date. This means that where data is collected into a single database from multiple independent databases, this has to be an ongoing procedure. Increasingly, privacy restrictions surrounding data means that providing data from one database into a combined database can come with restrictions around privacy issues.

SUMMARY

In many cases, it can be advantageous for a user to have an idea of the intersection between two datasets—in particular the intersection between his own dataset and that of a third party. For example, a user's dataset may comprise medical data on one million people, and a second dataset may comprise financial records for two million people. The user may wish to know how many of the people he has medical data for are also to be found in the second dataset, because this means that the financial and medical data can, for these people, be correlated.

This can, of course, be achieved by inspecting the datasets to find matches between data entries (e.g. the same value for "name", or any other key which allows it to be determined that data entries refer to the same real-world entity). However, this is insecure and does not allow for any retention of privacy. It would be desirable to provide a method of determining the dataset intersections in a secure and anonymised way.

According to one aspect of the present invention, there is provided a method of determining an indication of an intersection between a first dataset and a second dataset, the first and second datasets each holding entries in association with at least one key, the method comprising: generating for the at least one key in the first dataset location information in a first binary structure by applying a deterministic function to the entries associated with the key; transmitting the first binary structure to a comparison stage; generating for the at least one key in the second dataset, location information in a second binary structure by applying the same deterministic function to the entries associated with the key; and comparing, at the comparison stage, the location information in the first and second binary structures to determine the indication of the intersection between the first dataset and second dataset.

Embodiments of the present invention which are described in the following address some or all of the above issues and relate to: providing a data structure storing binary structures (e.g. bloom filters) generated from various datasets by applying a deterministic function to those datasets; and accessing the data structure in order to determine an indication of a user's dataset with one or more of the datasets represented in the data structure. To do so, the same deterministic function is applied to the user's dataset and the resulting values are used to generate a user binary structure which is compared with at least one of the binary structures in the data structure. The data structure itself is stored centrally (e.g. at a control processor), and the comparison is performed at a comparison stage which may be at the control processor. When the bloom filters for each of the datasets are of the same bit length, this aids in the comparison thereof. While bloom filters are described herein as an example of a data structure which can be used to determine an intersection between two datasets, an alternative example of such a data structure is hyperloglog.

A given entry in the first dataset may match with a single one entry in the second dataset, or may match with two or more entries in the second dataset. In the latter cases, it may be useful for a user to be informed of how much duplication there is. Hence, in an example, said comparing further comprises determining an indication of a duplication level of entries in the first and second datasets. The duplication level represents the number of times entries in the first dataset are duplicated in the second dataset, and can be calculated on a per-entry basis. That is, the number of times a given entry appears in the second dataset can be determined using, for example, a counting filter according to embodiments set out in the detailed description. The duplication level may then be the sum of the duplication number of all entries in the first dataset. This could be presented as an absolute number, or as a proportion of the intersection (e.g. a ratio or percentage).

In general a user may desire to have a high intersection and a low duplication level. Hence, in an example, the method further comprising determining a relationship between the intersection and the duplication level. The relationship for a given dataset pair may be a pair of numbers (e.g. integers) defining the intersection and the duplication level, or may be a mathematical relationship between the two such as a ratio. For example, the user may desire a high intersection to low duplication level ratio. The relationship may be presented to the user, or may be used in automatically selecting a dataset (e.g. automatically selecting a dataset having the highest intersection to duplication level).

In an example, said comparing further comprises determining an indication of a duplication level of entries in the first and second datasets.

In an example, the method further comprises determining a relationship between the intersection and the duplication level.

In an example, the first dataset is stored at a first computing device and the second dataset is stored at a second computing device.

In an example, the method further comprises the step of storing the binary structure in a computer store when the first dataset is added to a database access system.

In an example, the step of comparing comprises accessing the binary structure in the computer store.

In an example, the step of generating the binary structure is carried out on the fly each time an indication of the intersection is required.

In an example, the method is carried out at a controller of a database access system.

In an example, the computer store is located at the controller.

In an example, the binary structures are bloom filters, and the first and second bloom filters are of a common length.

In an example, the binary structures are counting bloom filters.

In an example, the method comprises providing in a computer stored data structure an identifier of each of the first and second dataset with an indication of the intersection of the first dataset with the second dataset.

In an example, the method comprises storing in the data structure an indication of the intersection of the second dataset with the first dataset with the identifier of at least one of the first and second dataset.

In an example, the comparison stage is located at the controller.

In an example, the method comprises a step of transmitting the second binary structure to the comparison stage.

According to a second aspect disclosed herein, there is provided a computer system for determining an indication of an intersection between a first dataset and a second dataset the system comprising at least one processor configured by one or more computer program to implement the steps of any method described herein.

In an example, the first dataset is stored at a first computer device and the second dataset is stored at a second computer device.

In an example, the at least one processor is located at a controller at a location separate from the first and second devices.

In an example, the computer system performs the method of the first aspect and comprises a computer store holding the data structure.

According to a third aspect disclosed herein, there is provided a computer program product comprising computer code which when executed by a processor implements the method of the first aspect or any example thereof.

According to a fourth aspect disclosed herein, there is provided a method of determining an indication of an intersection between a first dataset and a second dataset, the first and second datasets each holding data entries in association with at least one key, the method comprising: generating for the at least one key in the first dataset location information in a first binary structure by applying a deterministic function to the data entries associated with the key; transmitting the first binary structure to a comparison stage; generating for the at least one key in the second dataset, location information in a second binary structure by applying the same deterministic function to the data entries associated with the key; and comparing, at the comparison stage, the location information in the first and second binaries structures to determine the indication of the intersection between the first dataset and second dataset.

For a better understanding of the present invention and to show how the same may be carried into effect, reference will now be made by way of example to the following drawings.

BRIEF DESCRIPTION OF DRAWINGS

FIG. 7a is an example of the configuration file as illustrated in FIG. 7;

DETAILED DESCRIPTION

Nowadays every company holds valuable data, for example concerning attributes of consumers or potential consumers who may wish to access that data. Sharing customer data among different companies creates complex privacy and legal issues, as the data contained in customer records may be shared involuntarily. The problem is exacerbated by the fact that different departments within the same company, or among different companies may store data at different locations, and thus moving and selling data across sites poses security risks that may result in value leakage. Furthermore, different companies' storage formats are often not compatible and therefore increases the complexity in sharing customer data.

Even before performing any analysis of the data contained in the databases themselves, information concerning the expected outcome (e.g. an expected number of results) can be very valuable. Described below are techniques of database joining and querying, from which it will become clear that the size of the intersection between two datasets is of crucial importance. In general, a larger intersection will yield better quality results from a database joining or query, as it is only for data entries in the intersection that correlations between information in the separate databases can be performed.

Embodiments of the present invention relate to techniques of determining (an indication of) this intersection in a secure and anonymous manner. Before describing these, a technique for joining datasets will be described.

Figure 1:
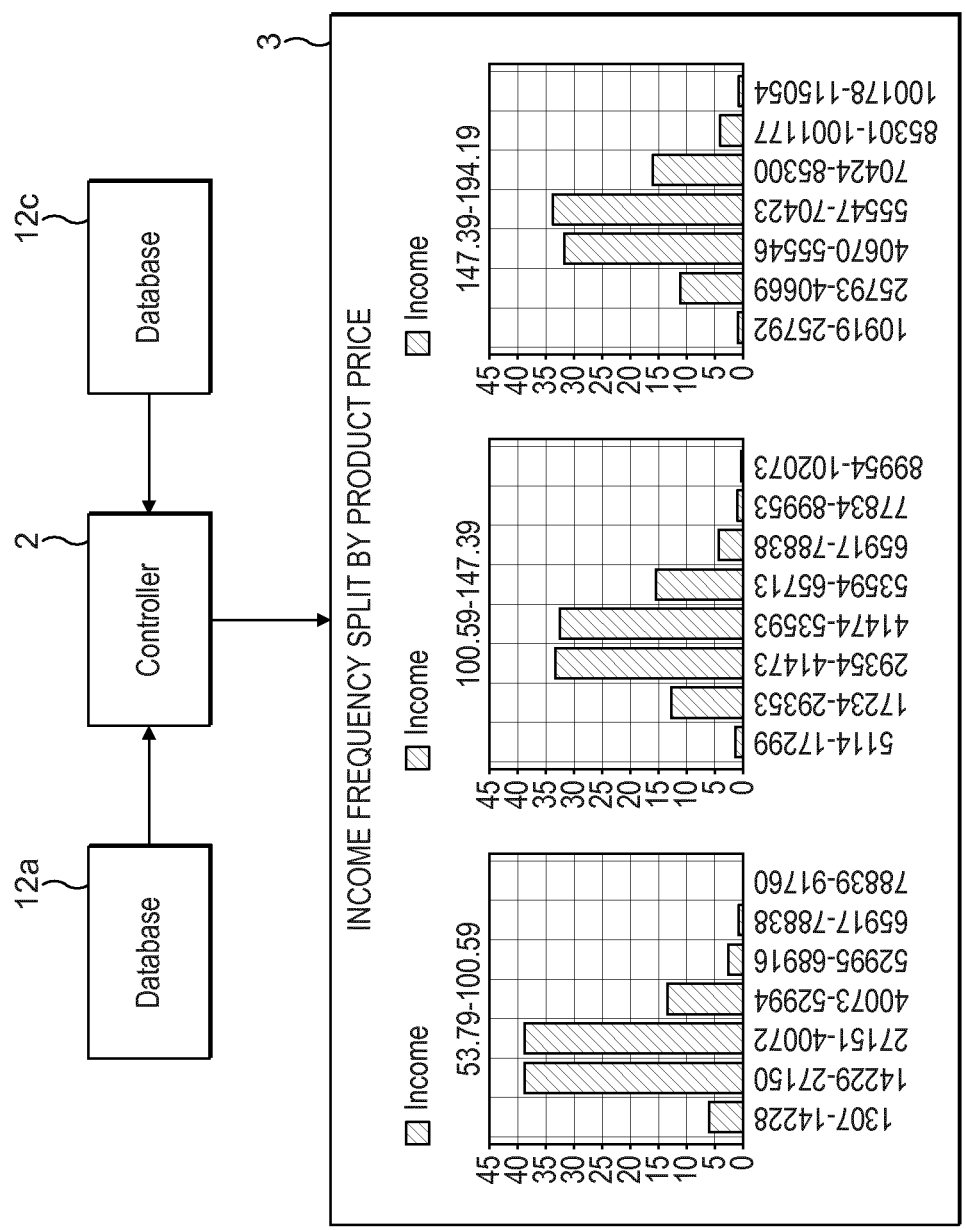
FIG. 1 is a schematic diagram illustrating a data joining system at a high schematic level.

FIG. 1 is a schematic diagram relating to a technique in which a query can be run over multiple datasets (databases in this example, though it is appreciated that a "dataset" may, in general, be stored on more than one database such as more than one server or other electronic memory device). Reference numeral 12a denotes a first database (e.g. a database of a financial organisation) which holds certain attributes within its records (entries). Reference numeral 12c denotes a second database (e.g. a database of a retail organisation) which holds certain attributes within its records (entries). The attributes in one database may be different to the attributes in the other database. Some entities may exist in both databases, and the challenge is to combine knowledge from both databases by joining data in a fully privacy compliant way without any records leaving each company's data centre. Reference numeral 2 denotes a controller which provides such a data joining service. An example output graph visible to a user is denoted by reference number 3; in this example it provides information on the spending habit of customers categorised by their annual income.

Figure 2:
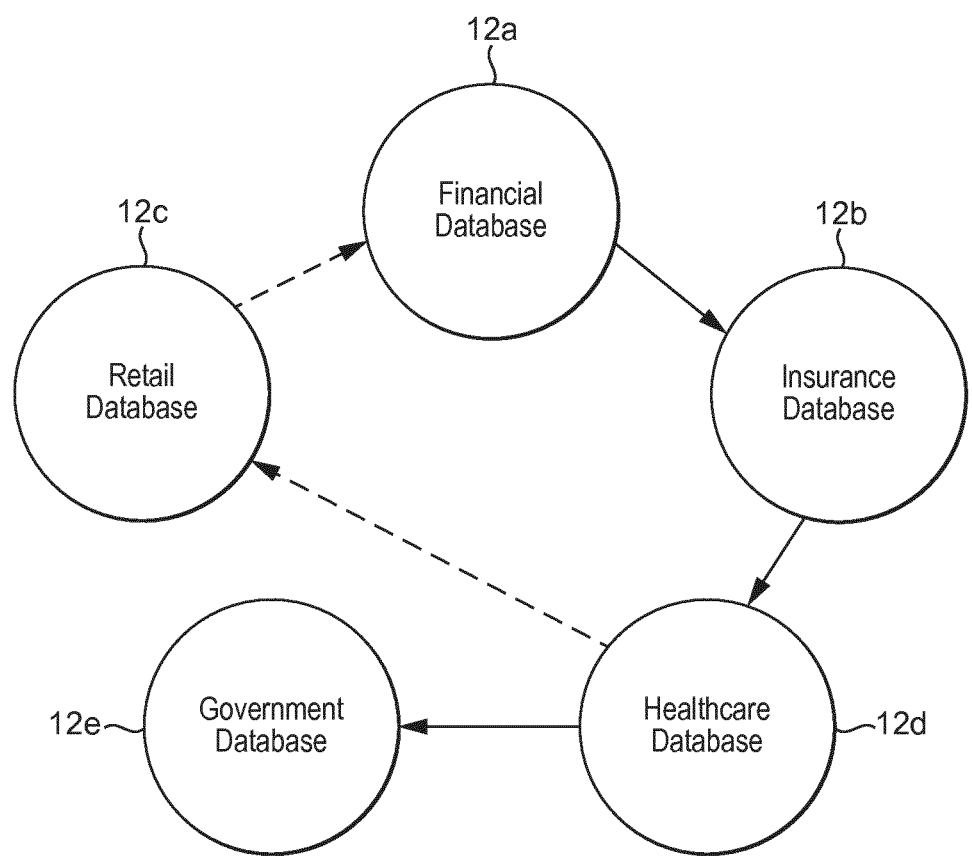
FIG. 2 is a diagram illustrating the method of data joining.

FIG. 2 shows schematically how data joining works for a data joining system with three organisations (Healthcare, Retail and Financial) shown by the dotted arrow, and for four organisations shown by bold arrows (Government, Healthcare, Insurance and Financial). In any case, queries can be created according to the existing datasets at each of the queried companies, in order to fully utilise all of the data available. A suitable filter, such as a list of hashes or Bloom filter, is created from a first query to be applied to one or more of the fields within each dataset to filter entries that does not correspond to a second query. Those matching entries in the dataset are then sent back to the cloud as returned data. The joining of combined datasets creates greater knowledge than a single database can offer on its own and in some cases allow new datasets to be created. Common identifiers (or joining factors), such as email address and telephone number, are used to identify data associated with a particular entry across different datasets. In some cases different common joining factors may be use depending upon their availability in the target datasets. The final results as presented to the user can be originated from any one of the queried organisations, but each of the returned data can be configured to meet individual privacy/redaction policies.

Data joining as described herein may be employed to join internal data from databases belonging to the same entity, external data from databases owned by a plurality of entities, or data from databases physically located across different countries. For example when joining internal data, the data joining system according to examples described herein provides a solution to combine datasets that are not allowed to be cross-contaminated, or are intentionally segregated by access restrictions, internal policies and regulations. It is also useful for joining many internal databases that are too large to be managed in a single instance, or combine knowledge of different databases across a large corporation. When deployed to join external datasets, the data joining system allows the companies to benefit from pooling their knowledge and therefrom creates new datasets, as well as to acquire knowledge of sensitive data that would not normally be shared. Furthermore, the data joining system allows data to be sold into newly created market places. In some cases the use of the data joining system overcomes juridical restrictions and allows data to be exported from a particular jurisdiction. The data joining system is also useful for joining datasets that are time consuming to synchronise or technically impractical to move among different countries.

Databases which can be accessed using the data joining service form a data joining network. As more companies subscribe to the data joining network, they each form a node on the network and become a part of a combined dataset that incorporates many small datasets, e.g. the data joining network may act as a central database. Furthermore, there is no limit to the number or size of the combined datasets across the subscribing companies, whilst each of them remain in control of who they wish to share their knowledge with.

Figure 3:
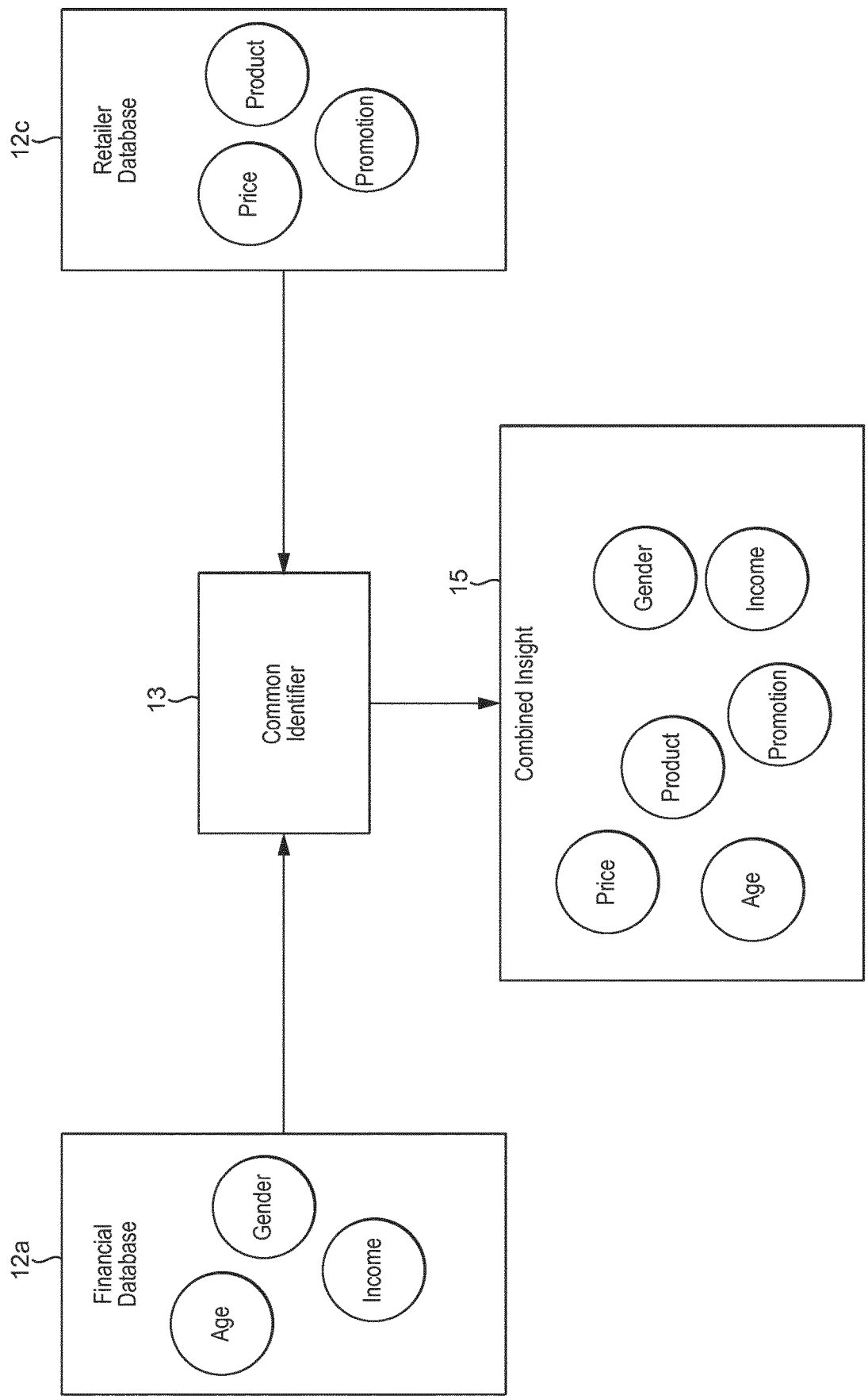
FIG. 3 is a schematic diagram illustrating a specific example where customers' transaction data is joined with their corresponding demographics data from two independently controlled databases.

FIG. 3 illustrates a specific example where a retailer cross-examines customers' transaction data and purchase history (e.g. price, product and promotion of past purchases) with their corresponding demographics data (e.g. age, gender and income) from a bank's dataset, using email addresses as a common identifier 13 (or joining factor). This provides a combined insight of customers 15 and allows the retailers to create bespoke promotion strategies for their target customers. For example, the combined dataset between the bank and the retailer reveals which promotions are used most frequently by different aged customers and based thereon tailor promotion strategy.

The data joining described herein offers a secure data sharing among different databases. In cases where the returned data is given in statistical form, customer records associated with the returned data never leave the owners' database. Moreover, the statistical data can comply with redaction rules to protect each individual customer's identity. Redaction control can be applied over the whole database or individual data fields.

The controller 2 can be embodied in the 'cloud' to provide a cloud service that facilitates data joining. The cloud service stores instructions for data acquisition (e.g. filtering expressions), but not the actual returned data. Moreover the queries can be controlled in real time and so they can be terminated as required.

In terms of access control, each sharing database is given its own set of access control so to allow bespoke control on who they wish share their knowledge with. This prevents accidental sharing of commercially sensitive data that would otherwise be detrimental to the owner of the sharing database. Restriction may also be imposed on queries requesting sensitive combination of fields in the dataset.

The described embodiments allow data from multiple discrete databases to be combined, allowing different owners of databases to consent to mutual use of each other's data without compromising security of their own database or anonymity.

Figure 4:
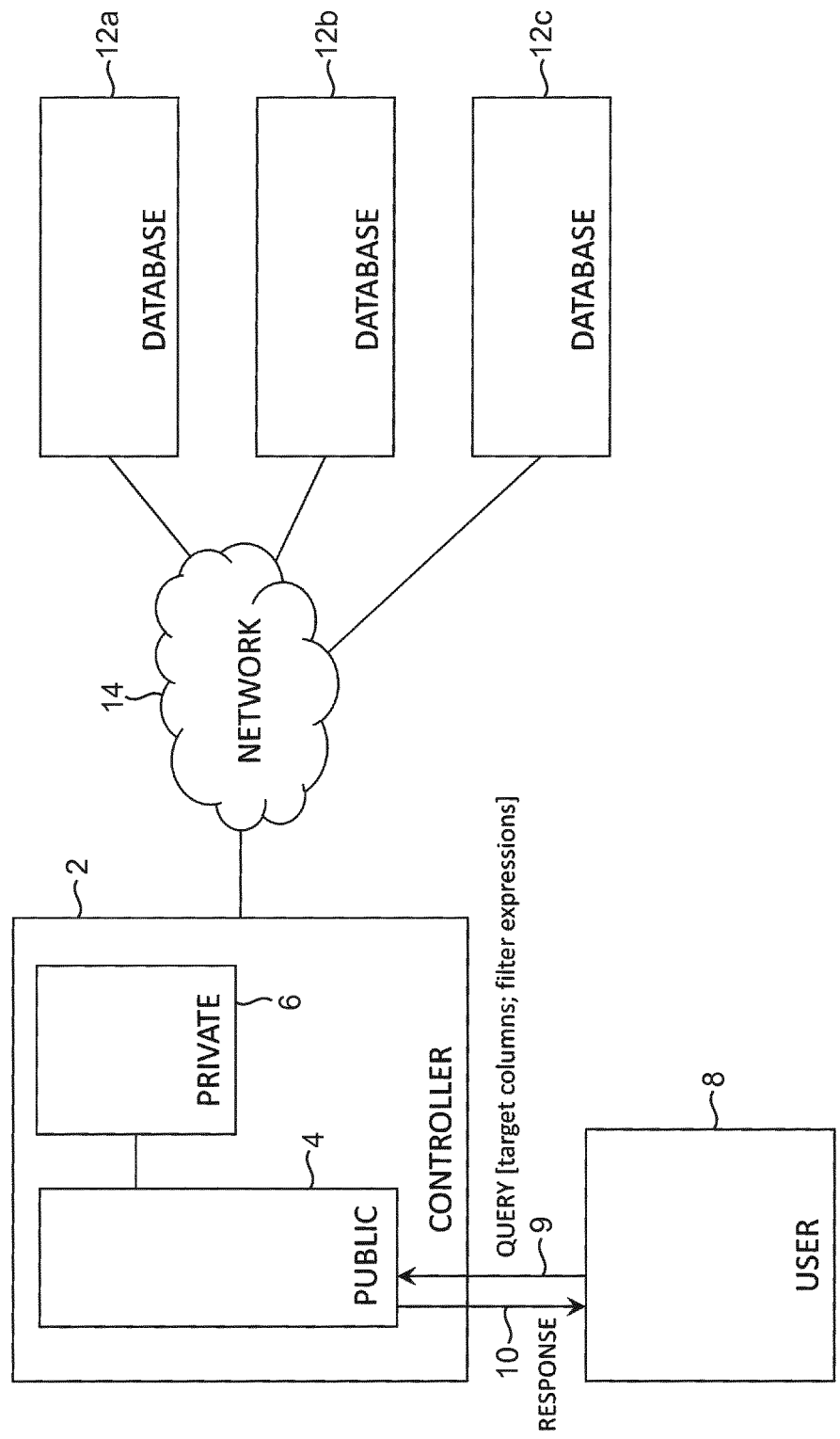
FIG. 4 is a schematic diagram illustrating a possible architecture for implementation of some embodiments.

FIG. 4 is a more detailed schematic block diagram of a system in which data from multiple discrete databases can be combined upon receiving a query from a querying user. The system comprises the central controller 2 which has a publically accessible component 4 and a set of private components 6 which implement a data combining process. The central controller can be implemented by software, firmware or hardware or any combination thereof. It could be a single server executing a computer program, or distributed over multiple servers, each running a load computer program, autonomously or in a distributed computing fashion. A user 8 has access to the controller 2 via a public interface, for example, which can be an application programming interface (API) in the controller 2. A user could be in contact with a controller 2 in any other way. Reference to a user herein refers to a user and/or a user device which can be any suitable computer device capable of generating and exchanging electronic messages. In particular, a user can generate a query 9 which he wants to run over multiple databases. That query can be generated by a human user providing manual input at an interface of a computer device, or it can be generated autonomously and automatically by a computer device itself.

Example queries are given later, together with examples of results of the queries delivered to the user.

The user 8 receives a response 10 following data combining processes carried out at the controller 2. The response 10 can take the form of a set of target entries resulting from combining the entries in the databases which satisfy expressions in the query. Alternatively, the response 10 can take the form of aggregated data as described in more detail herein, shown for example in a graphical format. The controller 2 is connected to multiple databases 12a, 12b, 12c. It can be connected via any suitable communication network 14, which could be a private Intranet or public Internet. Before going into a more detailed description of the architecture of the system, the basic principles of the data combining process will now be described. For this, reference is made to FIG. 5.

Figure 5:
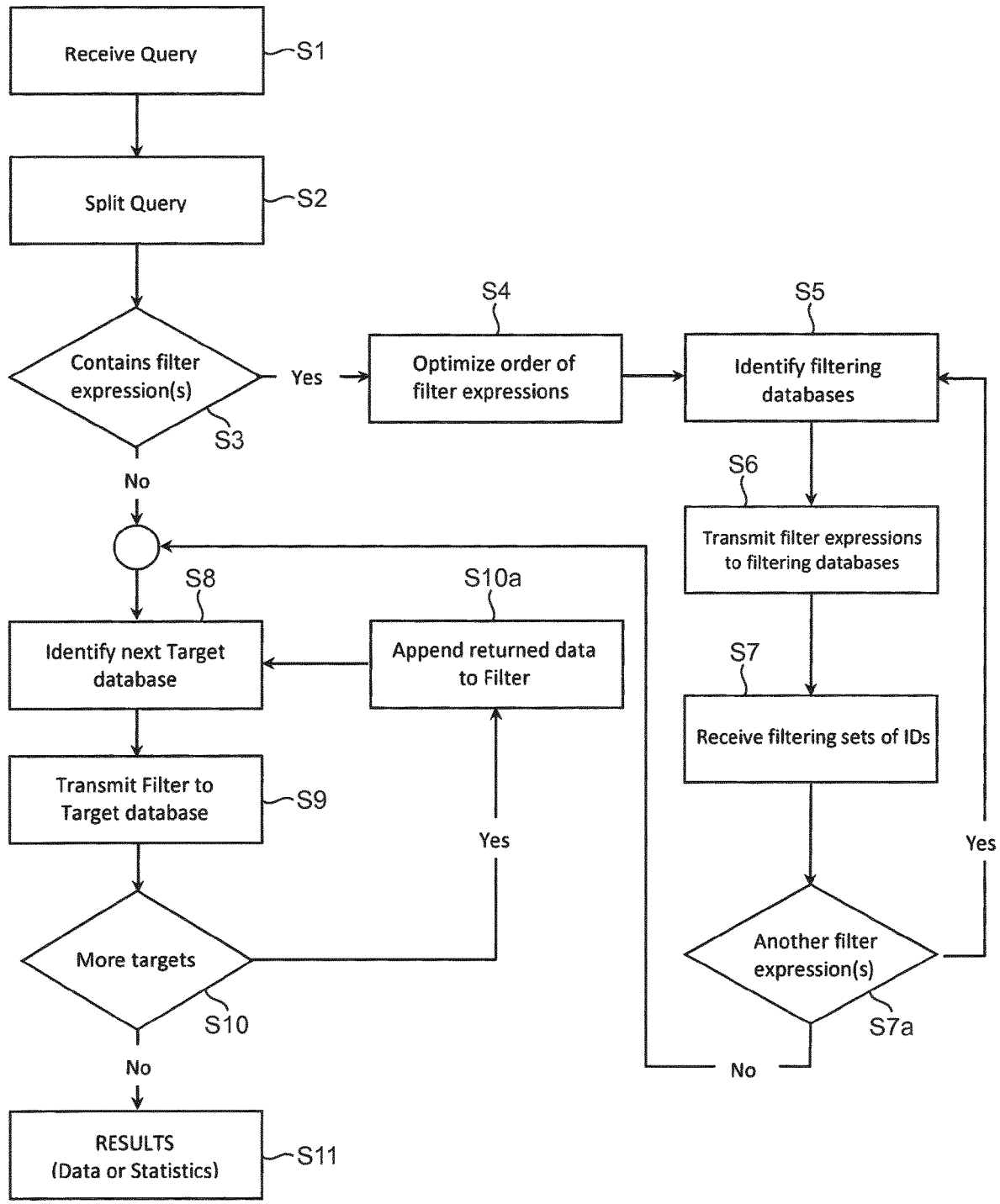
FIG. 5 is a flowchart illustrating processes carried out at a central controller.

As illustrated in FIG. 5, the first step of the process is the receipt of a query by the central controller 2 from the user 8, step S1. The query 9 comprises one or more target "columns" to receive data or statistics, and a set of filter expressions which the data or statistics should satisfy. For example, the query could ask for the number of data entries satisfying a certain age range and certain gender specification. Some examples are given later by way of illustration not limitation.

At step S2, the query is split into two queries, which are referred to herein as a filtering query and a target query. At step S3, a check is made to see whether or not the filter query contains filter expressions. If it does, the flow moves to step S4 where an order of the filter expressions is optimised. The purpose of this optimisation is to determine an order in which filter expressions are to be submitted to one or more database, as discussed in more detail later. At step S5 filtering databases are identified, each database being selected as the most appropriate database to deal with the particular filter expression. The central controller 2 stores information about all the databases to which it has access to allow it to identify appropriate filtering databases. This information is stored using a drone graph (44 in FIG. 7) described later. Each database is associated with a drone, which serves as a database agent on the software side. For example, the controller can identify which of the databases contains information related to the required filtering expression. At step S6, each filter expression is sent to the most appropriate database. When the first filter expression is sent to the first filtering database, it is run against the database to identify entries in that database matching the terms of the filter expression. For example, if the first required expression is an age range between 18 to 25, a filtering set of identifiers is returned from that database identifying database records satisfying the expression, for example, all the entities in the database aged between 18 to 25. Thus, the age range has produced a filtered set of identifiers. This filtered set can then be transmitted to a subsequent filtering database to act as a filter along with the next filter expression of the query, wherein the next filter expression is compared only to the entries in the database which satisfy the identifiers of the filtered set. Step S7 denotes the function of receiving the filtering sets of IDs, and step S7a the determination of whether there are additional filtering expressions. Once all filtering expressions have been utilised and run against their respective filtering databases, a final filtered ID set is produced. The process then moves to step S8 where a target database is identified for execution of the target query. For example, the target query in this case could be gender-based, for example, identify all females. In step S9, the filtered dataset and the target query are applied to the identified target database where the target query is run only against the identifiers which satisfy the identifiers in the filtered dataset. Note that a single filter expression can be sent to multiple databases, or multiple filter expressions can be sent to a single database. Note also, that in some cases there may be no filtering expressions (step S3) in which case the target query is just passed straight to one or more target database. It is important to recognise that no data records are transferred, only record IDs.

Note that there may be more than one target database, as well as or instead of, multiple filtering databases. Thus, a database could both produce a result set of record data and a filtering set of identifiers for a subsequent query. Note that one expression may be run against multiple databases, for example when more than one database satisfies the expression, but perhaps with incomplete records.

Step S10 checks for whether there are any more target queries or more target databases that need to be addressed with the target query and in the case that they are, the returned data is appended to the filter S10a and steps S8 and S9 run again on the next target database.

When all target databases have been queried, the final results are returned in step S11. Note that the results may be actual data entries, or aggregated statistics, depending on the context in which the method is applied. For example, "real data" could be provided in the results in a company internal implementation, while aggregated statistical results could be provided for public usage, for reasons of security and anonymity.

Figure 6:
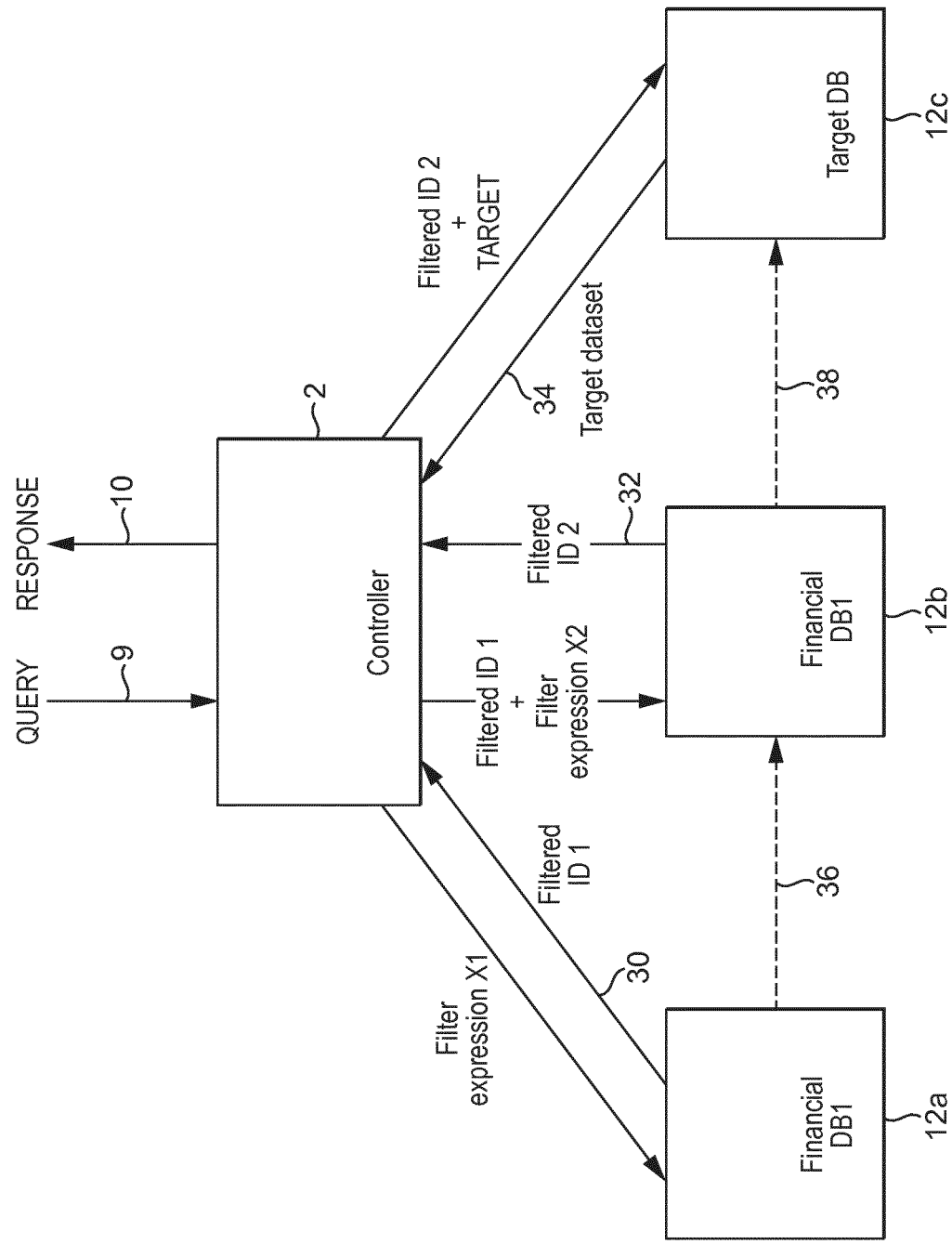
FIG. 6 is a schematic diagram illustrating the flow of FIG. 5.

FIG. 6 is a schematic architectural diagram which gives one example of the flow described with reference to FIG. 5. As shown in FIG. 6, a query 9 is received at the controller 2. In this case, the controller 2 splits the query into three separate queries, a first query with a first filter expression X1, a second query with a second filter expression X2, and a third target query with a target expression TARGET. As an example, the first filter expression could be an age range (e.g. between 18 to 25), the second filter expression could be income (e.g. more than £60,000) and the target expression could be gender (i.e. all females). The first query with the first filter expression X1 is sent to the first database 12a of a financial organisation labelled Financial DB1. This database is determined by the controller as being the best database for establishing data entries fitting a certain age range. A filtered set of IDs 1, 30, is returned to the controller 2. This filtered ID set includes record identifiers or records from the filter database Financial DB1 satisfying the first filter expression (that is, all data entries fitting the age range between 18 to 25). The filtered ID set 1 can comprise a list of hashed identifiers, where each identifies a data entry in the database, or can be a binary structure such as a bloom filter or the like. Other examples of suitable binary structures are Cuckoo Filters or Counting Filters (described in more detail below).

A bloom filter is commonly applied to test whether an element (e.g. one of the identifiers) is a member of a set. The set is a list of all identifiers and each identifier identifies one or more rows, which might be the database. More specifically, a bloom filter tests whether an element is certainly not present and therefore remove the need to seek elements that don't exist in a set. A query returns a result of either "possibly in set" or "definitely not in set". A bloom filter is particularly useful if the amount of source data would require an impractically large amount of memory if "conventional" error-free hashing techniques were applied. Moreover, the original used list of hashes cannot be generated from the filter, so it provides another level of anonymity. This is described in more detail below.

The filtered ID set 1 and the second query with the second filter expression X2 is then addressed to the second database 12b of another financial organisation labelled Financial DB2. This database has been identified by the controller as being a good database for extracting income-related data.

The query which is run over the second filter database is a query which matches the second filter expression X2 against only those database entries identified by the filtered ID set 1. This is therefore potentially a faster query to run and might reduce the amount of data to transfer. Moreover, note that there has been no requirement to "join" the records of the first and second filter databases into a common dataset. Thus, these databases can be completely independent, logically and/or geographically and do not have to have any common control or ownership. Note also that no raw data (database records) is expected.

A second filter ID set 2, 32, is returned to the controller 2 following the query which is run on the second filtering database Financial DB2 12b. The controller 2 sends the second filter ID set 2 and the target expression to a target database which it has identified. The result 34 of running the target expression TARGET against the identifiers in the filter dataset 2 (or the bloom filter) is returned to the controller 2. The controller 2 provides the response 10 to the user, which is either raw data or aggregated data as discussed herein.

As an alternative architectural possibility, the first filter ID set 1, 30 and the second filter ID set 2, 32 do not need to be returned to the controller. Instead, they could be passed directly from the first filter database to the second filter database, and from the second filter database to the target database respectively as indicated schematically by the dotted line arrows 36 and 38 moving to the right in FIG. 6.

Given the above, it is appreciated that the intersection between two datasets (e.g. stored at two databases) can be of great interest to the user. The following describe techniques which allow an indication of this intersection value to be determined ahead of time (i.e. before actually performing the joining and/or querying described above) in a secure and anonymous way.

Figure 14:
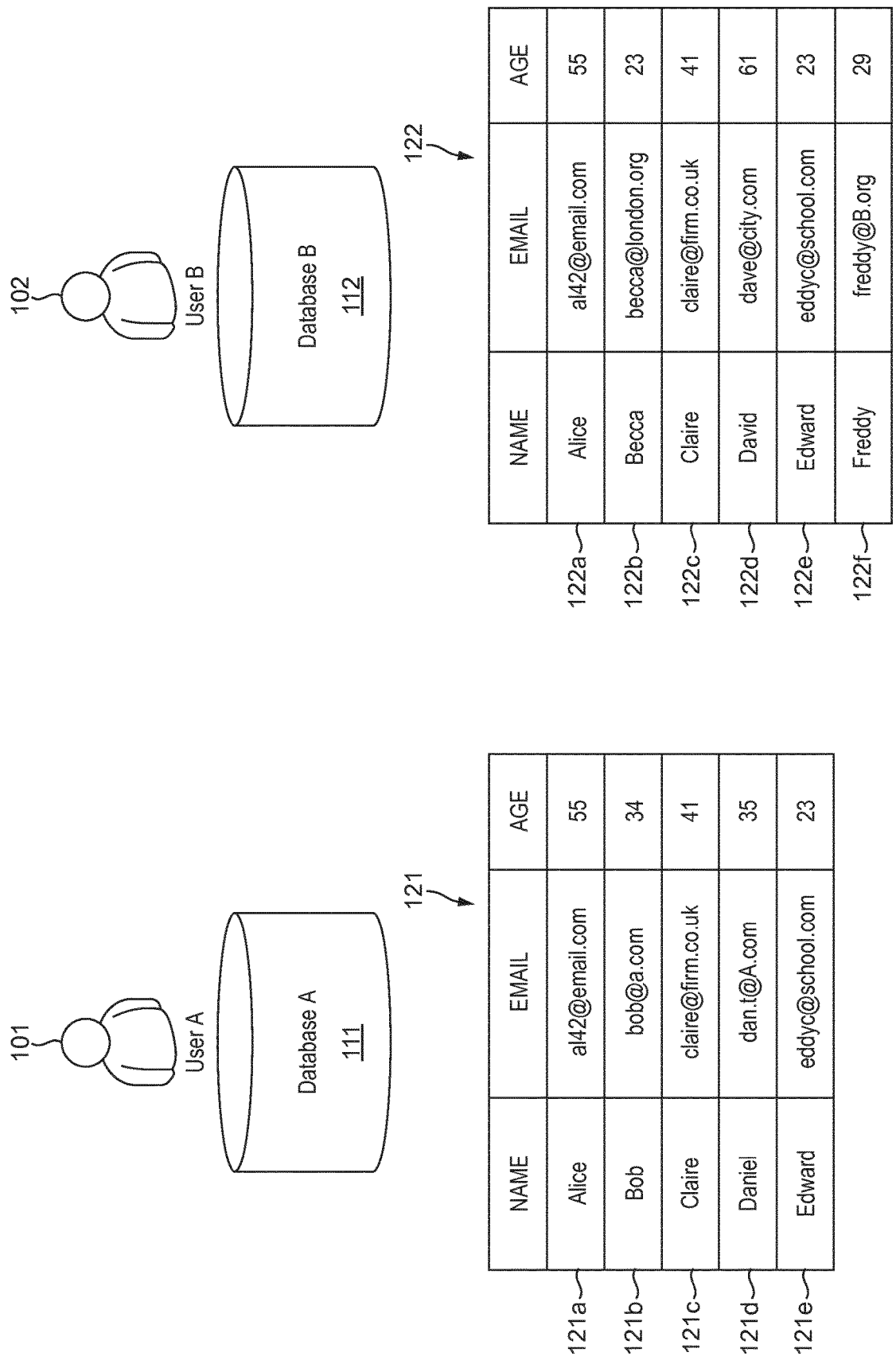
FIG. 14 shows two example datasets to be joined.

FIG. 14 shows a first user 101 (User A) who is the manager of a first server 111 and a second user 102 (User B) who is the manager of a second server 112.

User A uses the first server 111 to store a first data set 121 (Database A) comprising a plurality of entries 121a-e. In this example, each entry 121a-e relates to a person and comprises three fields of information about that person: name; email address; and age. It appreciated that greater or fewer fields may be present and also that only five entries 121a-e are shown for the purposes of explanation. That is, in practice the data set 121 may contain hundreds, thousand, even millions of entries.

Similarly, User B uses the second server 112 to store a second data set 122 (Database B) comprising a plurality of entries 122a-f. This data set 122 also comprises entries having three data fields (again name, email address, and age) but in general the two data set 121, 122 may comprise one or more fields that are not commonly present.

As shown in FIG. 14, the first data set 121 contains five entries (people) 121a-e and the second data set 122 contains six entries (people) 122a-f. Some of these are unique to one of the data sets (e.g. "Bob" 121b appears only in the first data set 121 and not in the second 122), but when datasets are to be joined, the assumption is that at least some entries "overlap" or "intersect", i.e. they reference the same person. For example, the first entry 121a in the first data set 121 is "a 55 year old woman called Alice with email address al42@email.com", and the first entry 122a in the second data set 122 is also "a 55 year old woman called Alice with email address al42@email.com".

That is, although these are separate data entries 121a, 122a themselves, it can be identified that they should be considered as referring to the same person if there is a match in a field which uniquely identifies that person (such as email address, social security number, etc.). This is particularly useful when the two datasets 121, 122 store different information about the individuals, as performing such a database intersection as described herein allows these different data to be correlated. For example, dataset 121 may additionally (not shown in FIG. 14) store data relating to the income (e.g. salary) of each person and dataset 122 may store data relating to health (e.g. medical records) of each person.

Figure 15:
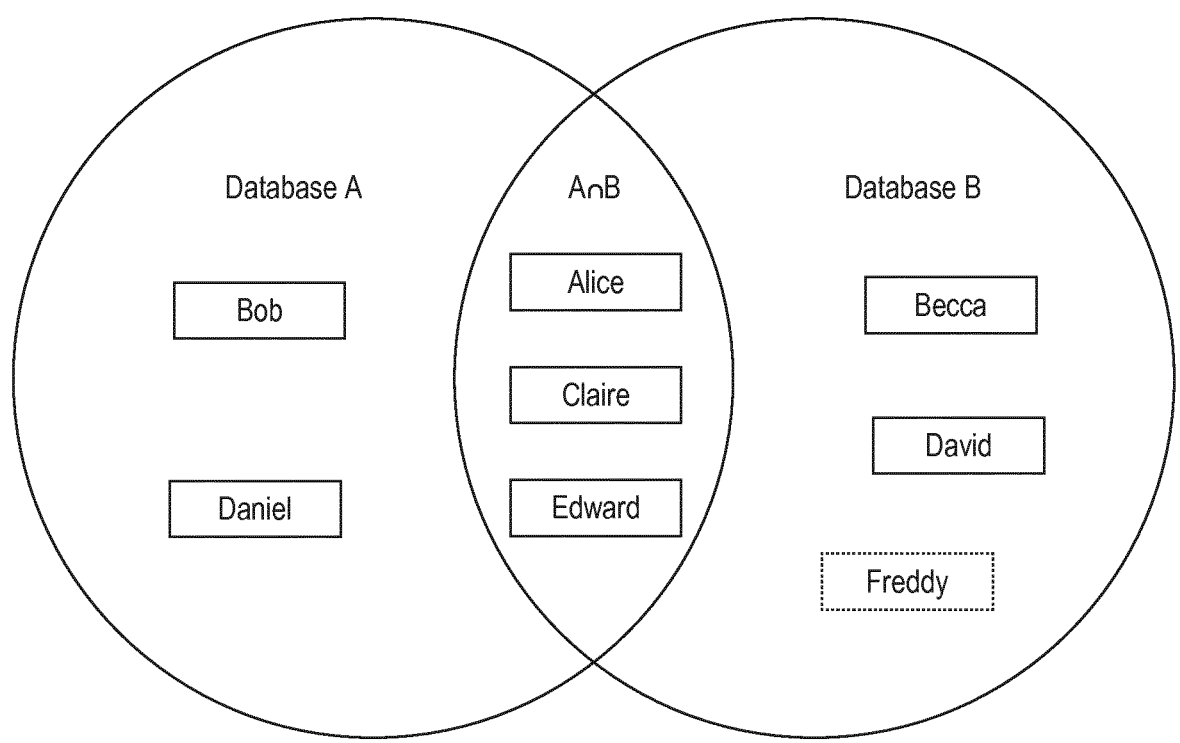
FIG. 15 is a Venn diagram shown in the join of datasets in FIG. 14.

Given the above, it can be helpful to visualise the databases as a Venn Diagram as shown in FIG. 15. Here, the following can readily be seen from inspection: Alice, Claire, and Edward are common to both Database A and Database B; Bob and Daniel are only found in Database A; and Becca, David, and Freddy are only found in Database B.

For a variety of reasons, User A and User B (or both) may wish to know (at least an indication of) the amount of "overlap" between the databases 111, 112. This amounts to determining (again, an indication of) the intersection of the two sets of entries 121a-e and 122a-f. I.e. the number of entries found in the intersection A∩B of the Venn Diagram in FIG. 15.

This can be accomplished in theory by inspecting the database entries directly to identify matches between them. However, the numbers of entries may be very large. Moreover, some or all of the information in either or both of the databases may be confidential in that the manager of the respective database does not want that information to be publically available, which here means that the manager does not want the other manager to be privy to it. For the purposes of explanation, it is assumed that information pertaining to Freddy, i.e. entry 122f in Database B is confidential. That is, User B does not want User A to have access to information in the entry 122f stored in his database.

This means that the simple inspection-based method mentioned above cannot be carried out by the managers (User A or User B) themselves, particularly not User A as this would involve User A accessing entry 122f, which is unacceptable to User B. One solution to this is for an external third party to perform the database inspection. However, this is only acceptable if both managers are comfortable allowing the third party access to their respective database. It would therefore be desirable to provide a method which allows (at least an indication of) the overlap between two databases to be determined by the managers of the databases themselves in a manner which does not require disclosure of information within the databases.

The technique described herein provides such a solution by generating, for a plurality of datasets, a respective binary structure for each key in the dataset which therefore encodes information about the data entries having that key in that dataset. These binary structures are stored at a central location to allow a user of a user dataset, at a later point in time, to determine indications of intersections between the user dataset and any of the datasets initialised in the binary structure repository. That is done by generating a user binary structure from the user dataset and transmitting it to the central location to be compared against at least one respective binary structure in the repository to determine the indication. This is described in more detail below in relation to FIG. 19.

One example of such a binary structure is a bloom filter. A bloom filter is a bit string of length n onto which has been encoded information about a set of data values. The (n) bits of the bloom filter are all initialised to 0. A data value is encoded onto the filter by applying a set of k hash functions to the data value which each return (modulo n, if the algorithm allows for results greater than k) a respective integer between 1 and n (that is, the data value is transformed into a set of k integers) which are then interpreted as positions within the bit string. The bits at these (k) positions are then re-written to 1. Further data values can be written to the (same) bit string using the same method. If one or more of the hash functions, when writing a further data value, points to a bit in the filter which is already 1 (i.e. written to encode some earlier data value), it remains a 1 after writing the further data value.

Note that k can be equal to 1 (though it usually greater). That is, a single hash function may be used.

The bloom filter, once written, allows for the quick determination that a test data value is not a member of the original (encoding) set. To do so, the same k hashes are performed on the test value. If any one of the bits in the string at those locations is a 0, the test value was not a member of the original set (otherwise this bit would have been rewritten as a 1). False positives, however, are possible because the k hashes of the test value could by chance point to locations in the string which were indeed written during encoding, but in the context of determining intersection of datasets, this does not significantly impact the usefulness of results.

Another example of a data structure is the result of a hyperloglog algorithm applied to the data sets. A hash function is applied to each data entry of a dataset to obtain a set of hashes which are assumed to be uniformly distributed random numbers. The set is divided into smaller subsets (each of which may be stored in a register), and the maximum number of leading zeroes is calculated in each subset. This gives an estimate of the cardinality of each subset according to the hyperloglog theory that if the maximum number of leading zeros is n, an estimate for the number of distinct elements in the set is 2 to the power n. By merging the subsets of multiple data sets, an indication of the intersection can be provided.

Another example of a binary structure is a counting filter (sometimes called counting bloom filter) which is an extension to the bloom filter concept which keeps track of the number of data entries written to it. FIG. 18a illustrates an example counting filter 405. The filter 405 is constructed by writing to position values in the manner described above, but without each position being restricted to a single bit. That is, each position can be, e.g. a 4-bit number, which is incremented each time it is written to. Hence, if the same value using, e.g. three hash functions, is written to the counting filter 405 four times, the three locations in the filter corresponding to the hash values will each be set to four (barring extra data writing).

A counting filter is usually implemented for its advantage in allowing delete operations (i.e. entries can be removed from the counting filter without having to reconstruct the entire filter, as one would have to do with a bloom filter). However, the present invention recognises a further advantage of using a counting filter, as explained below.

With reference to the intersection determination described above, note that a data entry in one dataset may in fact "match" with more than one data entry in a second dataset. For example, a first dataset with health data identified by name keys may including an entry such as "John Smith, [health data]". If a second dataset comprises financial data identified by name keys but stored as separate entries per financial year (e.g. "John Smith, [financial data 2016]" and "John Smith, [financial data 2017] as separate entries), then it may be useful to know not only that the health data entry does match an entry in the financial dataset, but that it in fact matches two data entries. This information is lost in a standard bloom filter because both of the entries in the second dataset are identified by the same key and therefore produce the same set of (one or more) hash values. A counting filter, on the other hand, allows to keep track of how many entries are written to it and therefore an indication of how many matches there are with a given key can be determined, rather than just an indication that there is or is not a match.

For example, consider the bloom filter 406 shown in FIG. 18a which may represent a single data value written to the bloom filter 406 using three hash functions. Hence, the bloom filter 406 comprises three "set" bits, and the rest "unset" bits. This bloom filter 406 may represent the data in a first dataset and the counting filter 405 may represent the data in a second dataset. To compare the first and second datasets, the bloom filter 406 can be compared with the counting filter 405. In this example, it can be determined that the data value of the first dataset is present twice in the second dataset, because each of the locations is set to "2" in the counting bloom filter 405. In general, the number of occurrences in the second dataset can be determined as the minimum value of the values in the counting filter 405 which correspond to locations in the bloom filter 406 which are set to "1".

To compare the entire bloom filter 406 with the counting filter 405, the sum of the values in the counting filter 405 at locations where the bloom filter 406 is set to "1" can be divided by the number of hashes. This may be rounded down to the nearest integer. In this example, the sum is 2+2+2=6 and the number of hashes is 3, thus giving 2 as the (estimated) total number of occurrences of values from the bloom filter 406 in the counting filter 405. Note that even though bloom filter 406 in this example is written by only one data value, this method applies to bloom filters written by more than one value, A bloom filter can be constructed from a counting filter. FIG. 18*a* also shows a bloom filter 407 constructed from the counting filter 405, which can be done by applying the Signum function sgn(x) in a bit-wise fashion. This is a one-way operation.

Figure 16A:
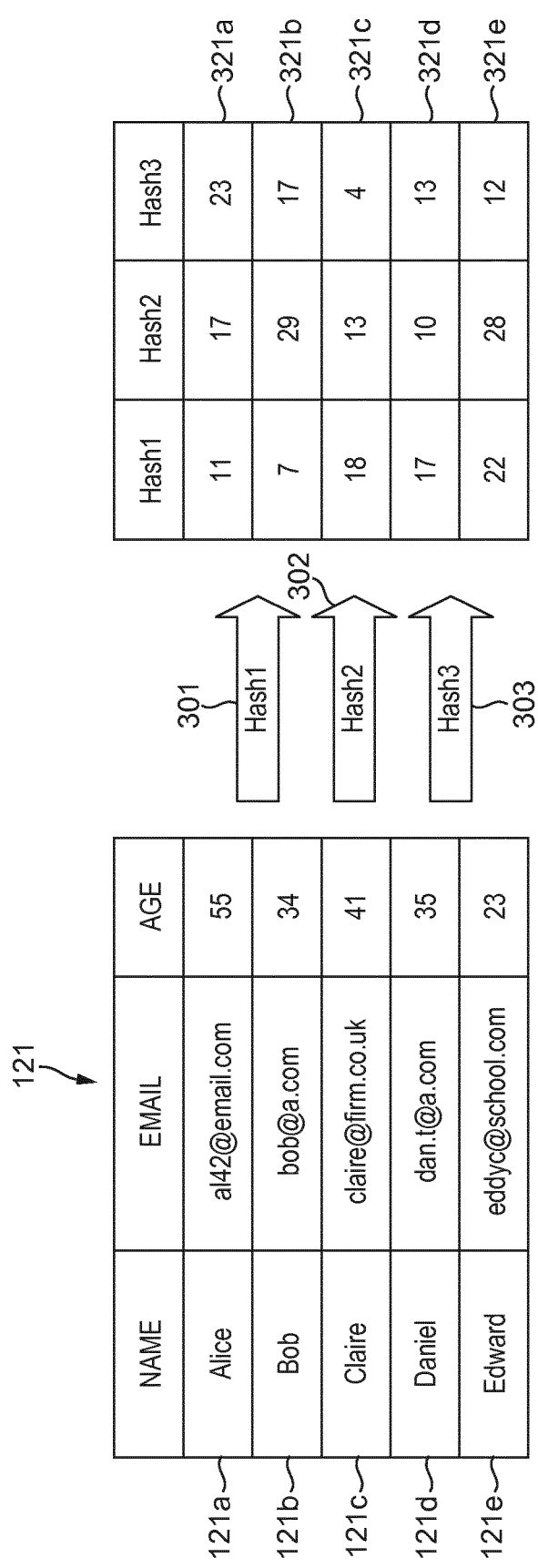
FIGS. 16a, 16b, 17a and 17b show the construction of bloom filters.
Figure 16B:
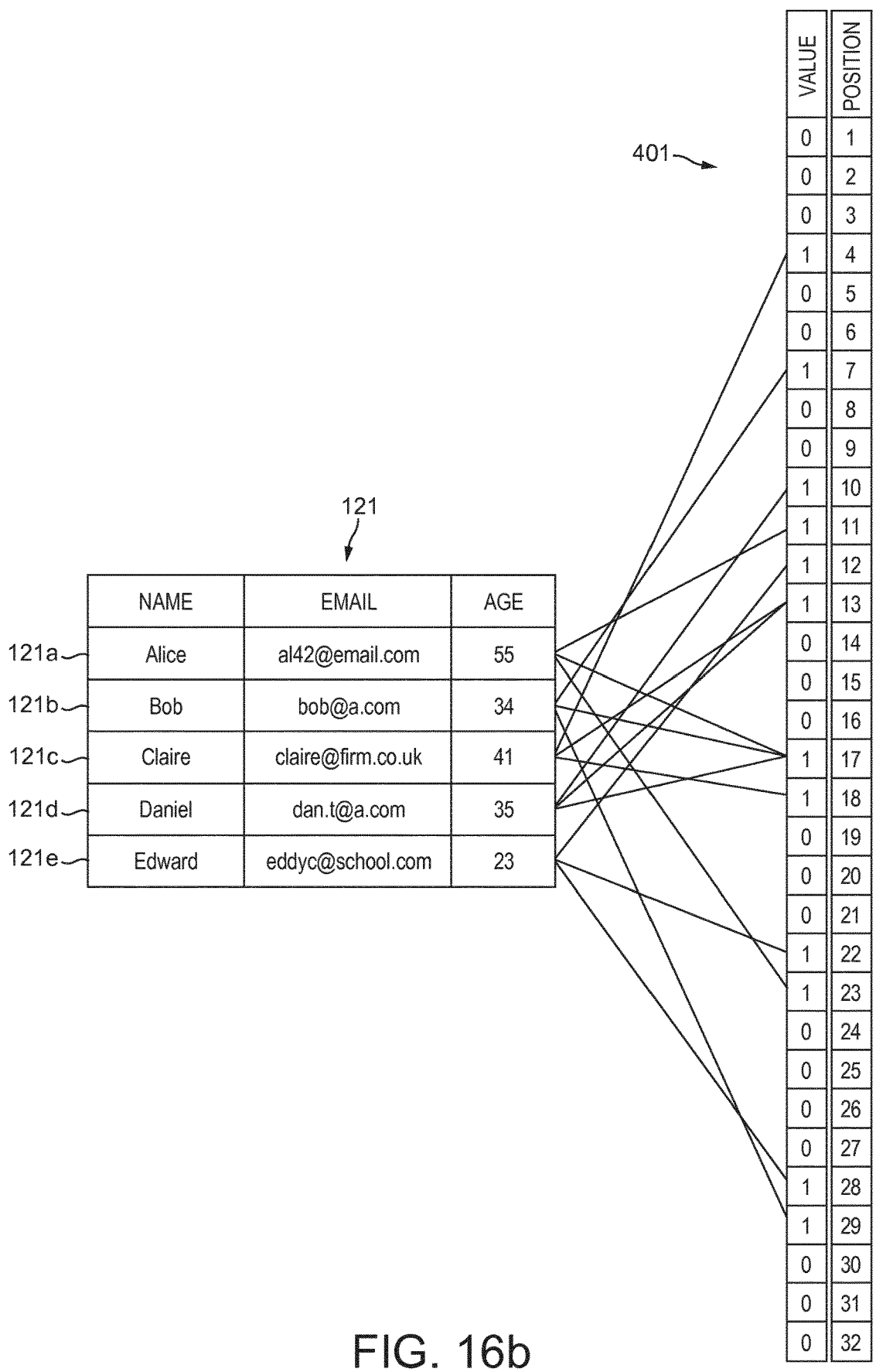
Figure 17A:
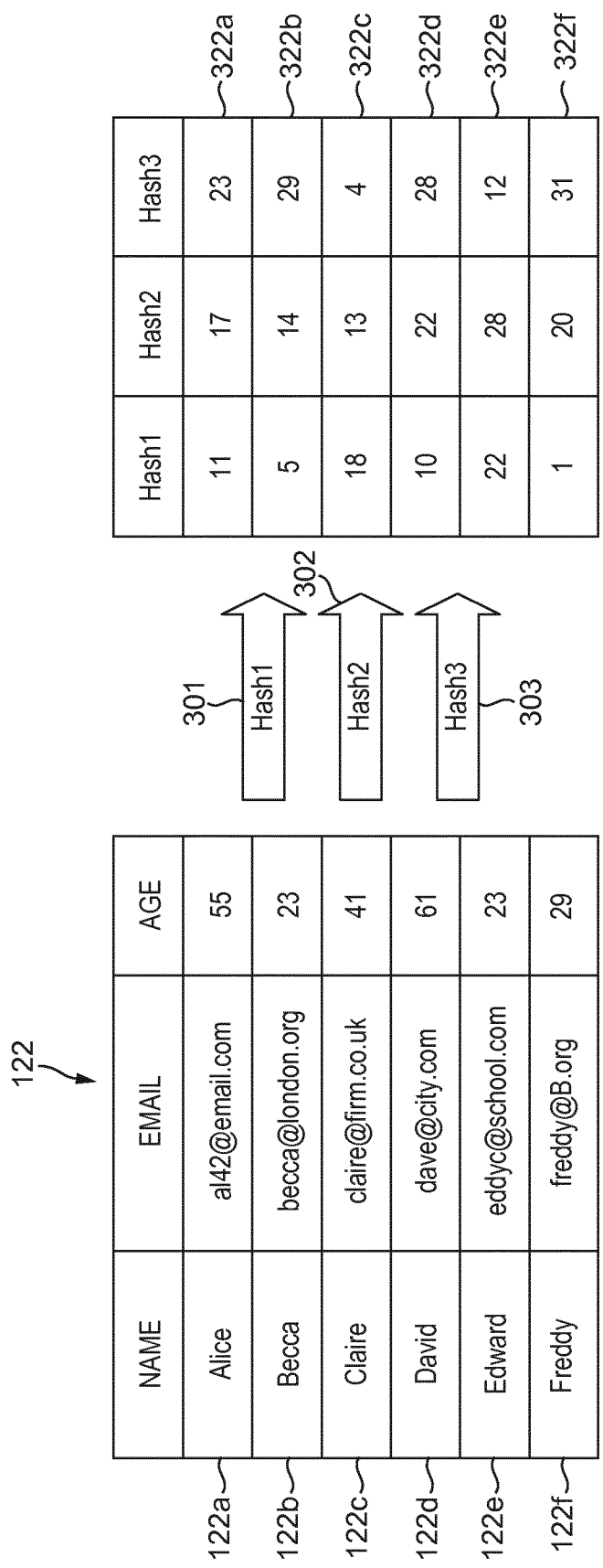
Figure 17B:
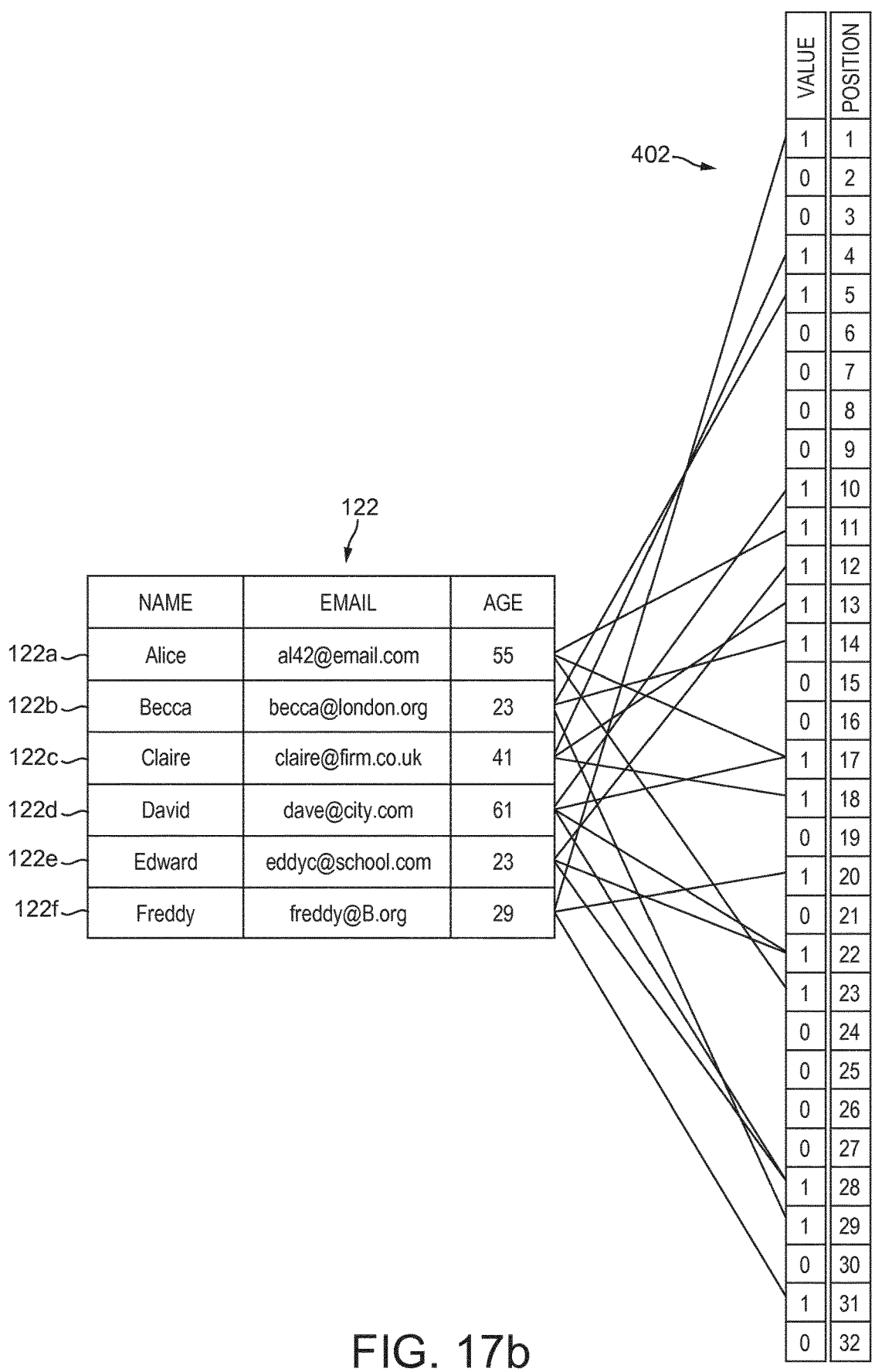

FIGS. 16*a*, 16*b*, 17*a* and 17*b* continue the example of FIGS. 14 and 15, by showing construction of a first bloom filter 401 from Database A (FIGS. 16*a* and 16*b*) and a second bloom filter 402 from Database B (FIGS. 17*a* and 17*b*). In this example, n=32 and k=3. That is, the bloom filter is 32 bits in length and three hash algorithms are used.

In FIG. 16*a*, the first hash algorithm 301 (Hash1), the second hash algorithm 302 (Hash2), and the third hash algorithm 303 (Hash3) are each performed on the first data entry 121*a* (Alice), resulting in a triplet of integers 321*a* (10, 16, 22). The bits of the bloom filter at these positions are accordingly set to 1. The first data entry 121*a* is thus encoded in the bloom filter. The same three hash algorithms 301, 302, 303 are applied to each of the other data entries 121*b-e* resulting in corresponding integer triplets 321*b-e* which are also written to the bloom filter.

The end result of this process is illustrated in FIG. 16*b*. The resulting bloom filter 401 comprises a string of 32 bits, the values of which encode information about the first database 121. Note that, as known in the art, the hash algorithms 301, 302, 303 are each designed such that, for a random input, they return each integer between 1 and 32 (between 1 and n) with an uniform distribution. Hence, some data entries 121 when written to the filter 401 may "overlap" in the sense that they may hash to the same integer. If there is no overlap (more likely for large n), then the number of 1s in the filter will be k per data entry encoded. This would be 3×5=15 in the example of FIGS. 16*a* and 16*b* but there is overlap which results in only twelve 1s in the filter.

FIGS. 17*a* and 17*b* illustrate the corresponding steps as applied to the second database 122. Each of the hash algorithms 301, 302, 303 is applied to each of the data entries 122*a-f* resulting in a respective triplet of integers 322*a-f* for each entry. Again, these triplets are used to encode the data entries 122*a-f* onto the second bloom filter 402 as shown in FIG. 17*b* using the same process described above.

Note that the hash triplet 322*a* (10, 16, 22) for data entry 122*a* (Alice) in the second database 122 matches the hash triplet 321*a* (10, 16, 22) for data entry 121*a* (Alice) in the first database 121. This is because the hash algorithms 301, 302, 303 are deterministic, i.e. they produce the same output for a given input each time. Hence, the fact that triplet 321*a* matches 322*a* indicates that an entry in the first database 121 matches an entry in the second database 122. However, as the hash functions are non-reversible, it is not possible to determine which database entry this is (nor is it possible to access the informational content of the data entry from the hash triplet 321*a*, or 322*a*).

It is understood, from the above, that which bits are 1s and which bits are 0s in the two bloom filters 401, 402 will correlate exactly if the entries of the databases 121, 122 are identical. However, an exact correlation between the bloom filters 401 and 402 does not necessarily mean that the entries of the two databases 121, 122 match. Instead, only a probability can be calculated. Techniques to perform set operations, such as the intersection (A∩B) of two sets or the union (A∪B) of two sets, on bloom filters representing the sets are known in the art, and so mentioned here only briefly.

Figure 18:
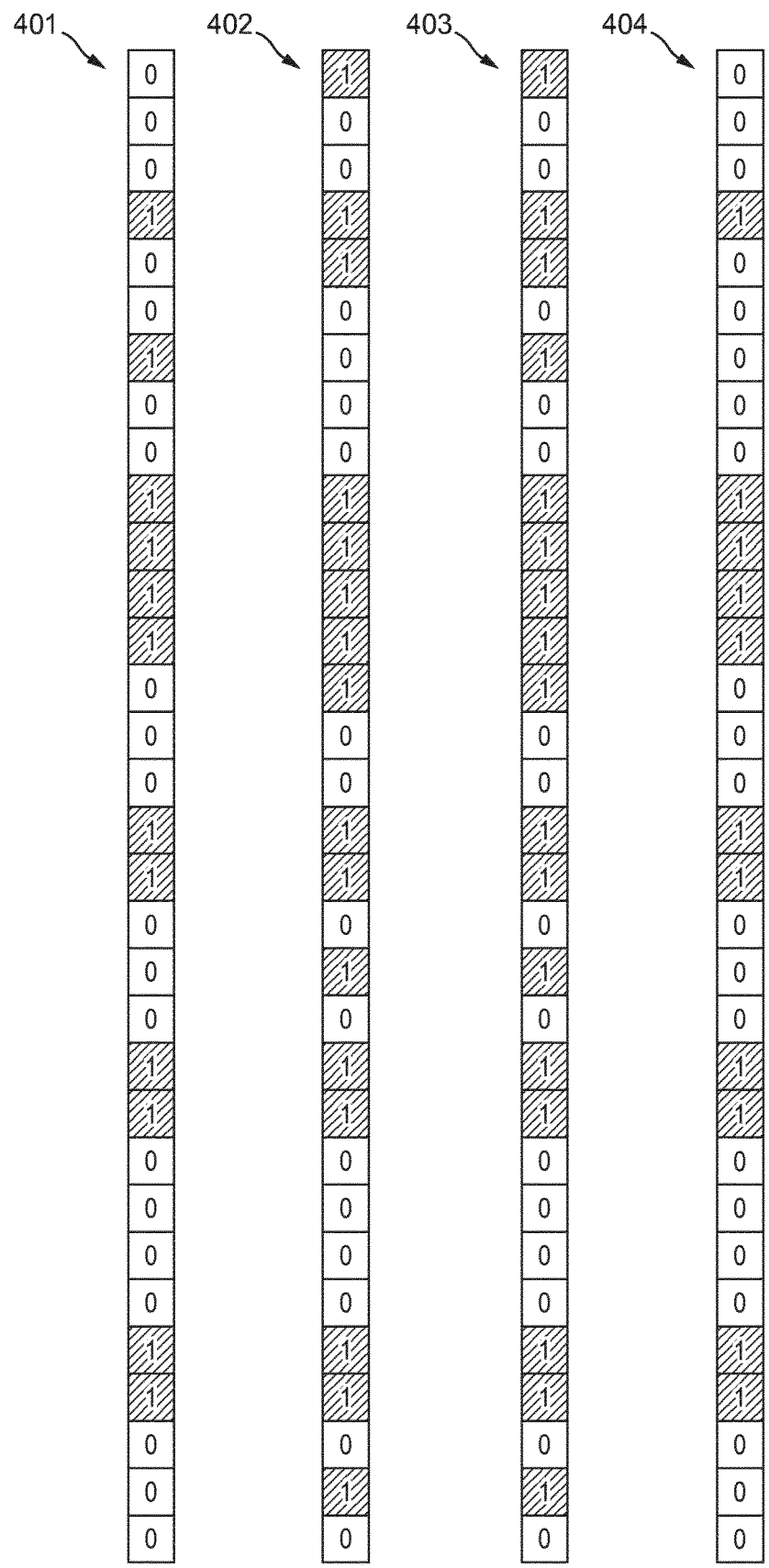
FIG. 18 shows generated bloom filters.
Figure 18A:
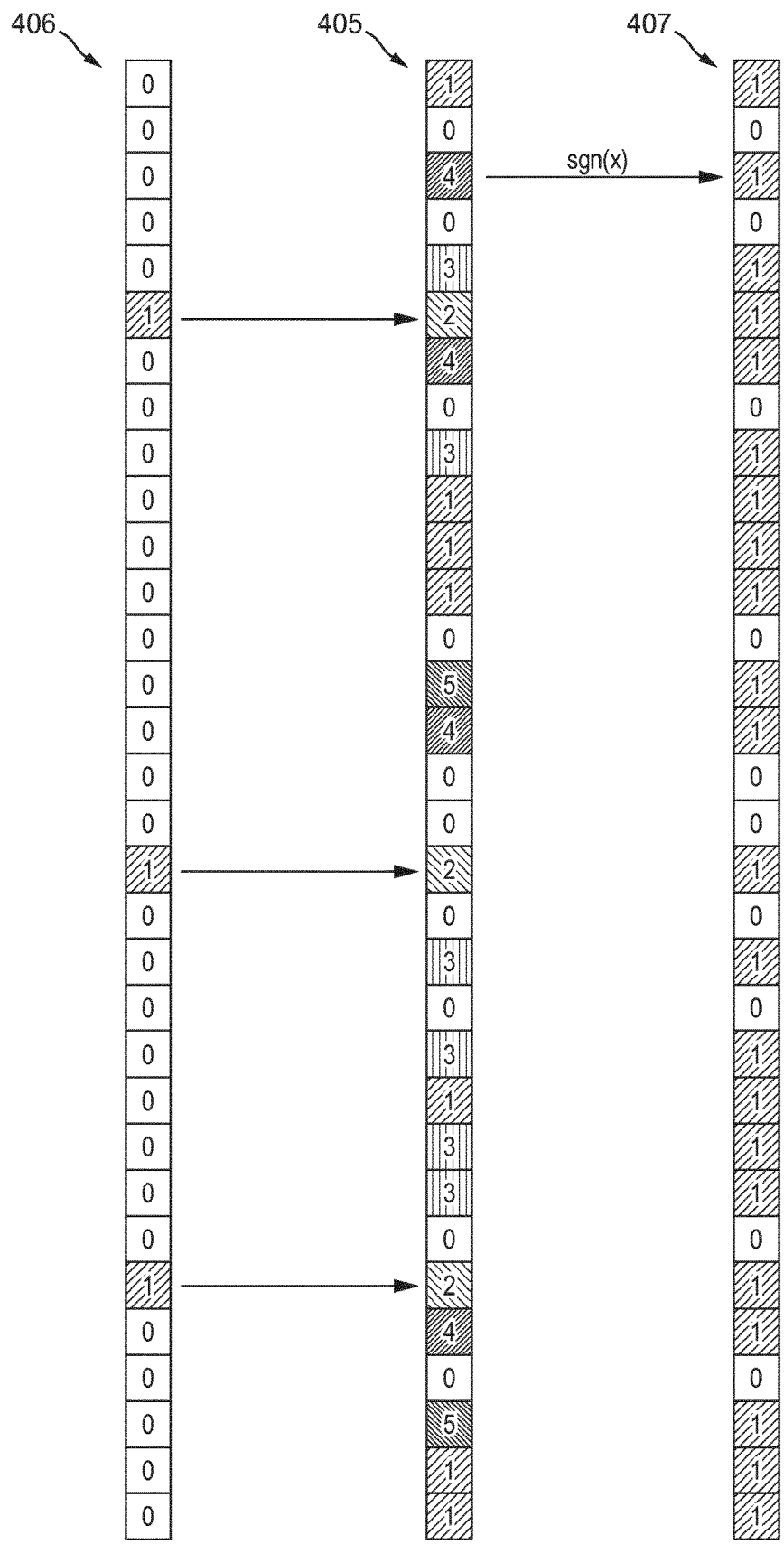
FIG. 18a shows generated counting filters.

The Union of the two sets of data entries 121, 121 can be estimated by constructing an "auxiliary" bloom filter 403 being a bit-wise Boolean OR operation of the two bloom filters 401, 402, as shown in FIG. 18. That is, the bit as position "x" in the auxiliary bloom filter 403 is a "1" if the bit at position "x" in either of the input filters 401, 402 is a "1".

The Intersection of the two sets of data entries 121, 121 can be estimated by constructing an "auxiliary" bloom filter 404 being a bit-wise Boolean AND operation of the two bloom filters 401, 402, as shown in FIG. 18. That is, the bit at position "x" in the auxiliary bloom filter 404 is a "1" only both the bit at position "x" in the first 401 and second 402 filter are "1".

Figure 19:
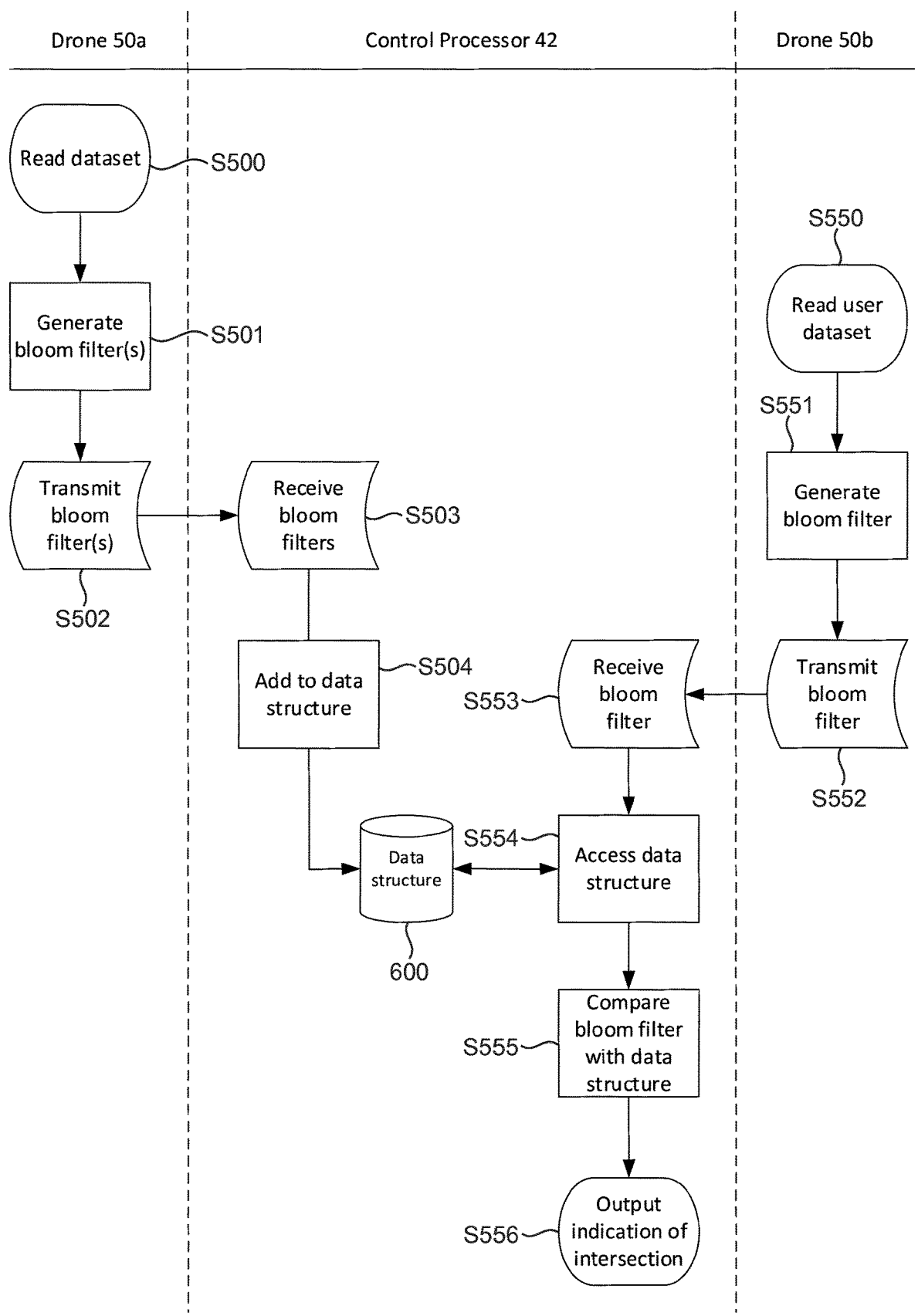
FIG. 19 is a flowchart showing how intersections are determined.

FIG. 19 shows a flow diagram for the purposes of illustrating methods in accordance with embodiments of the present invention. Steps S500-504 relate to storing bloom filter data in the data structure 600, and Steps S550-556 relate to using the data structure 600 to determine an intersection of a user's dataset with one (or more) of the datasets represented in the data structure 600.

Steps S500-S502 are performed by drone 50*a* which represents any drone of a dataset to be included in the data structure 600. Steps S550-S552 are performed by drone 50*b* which represents the drone of the user's dataset (i.e. the user wishing to retrieve intersection data). Steps S503-S504 and S553-S556 are performed by the control processor 42.

The data structure 600 itself may be stored locally at the control processor 42 (i.e. in a local memory 47 of the control processor 42) as shown in FIG. 19.

Steps S500-S504 relate generally to initialising or otherwise updating the data structure 600 in accordance with a dataset. In step S500, the drone of that dataset (drone 50*a*) first reads in the data from the dataset. The drone 50*a* then generates, for each key in that dataset, a bloom filter at step S501. The process of generating a bloom filter was described above, so it is understood that the result of step S501 is a set of bloom filters (one for each key) onto which have been encoded the data entries found in the dataset which have the respective key of that bloom filter. At step S502, these bloom filter(s) are transmitted to the control processor 42. All of these bloom filters are of the same length (i.e. comprise the same number of bits—"n" as described above). The bloom filters generated from different datasets are also the same length.

At step S503, the control processor 42 receives the bloom filters and they are added to the data structure 600 by the control processor 42 in step S504. This comprises storing the received bloom filters in the data structure 600 stored in memory 47. The bloom filters are stored in association with at least an identifier (ID) of the dataset from which that bloom filter was generated and the key type. For example, the bloom filter generated by drone 50*a* from key type "age" in step S501 will be stored as "[bloom filter; ID=50*a*; key=age]". A second bloom filter generated by drone 50*a* but from key type "salary" will be stored as "[bloom filter; ID=50*a*; key=age]". Hence, the data structure, when compiled, comprises a list of bloom filters identified by their dataset ID and key type.

It is understood that above-described steps outline how the data structure 600 is generated and updated to include bloom filters (one per key) for any arbitrary dataset. Hence, it is also understood that following these steps (which may be performed in relation to multiple drones 50) the data structure 600 stores bloom filters relating to at least one data set. The following steps, as described below, relate to using the data structure 600 (once configured using the above steps) to determine intersection data between a user's data set and at least one dataset represented in the data structure 600.

At step S550, drone 50b reads the user's dataset. I.e. accesses the dataset. This may be, for example, the customer database 54 as described in more detail with reference to FIG. 7.

The drone 50b generates hash values from the user's dataset. This comprises using precisely the same hash function (and same number of hash functions) as were used to generate the bloom filters in step S501. That is, the hash functions are applied to each of the data entries in the user's dataset to generate sets of hashes as described above in relation to FIG. 17a. The hashes generated are then, in step S551, used to construct a bloom filter, in the same manner as described above.

The bloom filter is then transmitted by the drone 50b in step S552 and received by the control processor 42 in step S553. In response to receiving the bloom filter, the control processor 42 accesses the data structure 600 to retrieve bloom filters at step S554. This comprises retrieving bloom filters in the data structure 600 having keys which match the keys of the user dataset from which the hashes were generated in step S551. Hence, the control processor 42 now has a user bloom filter(s) representing data entries of the user's dataset (one per key) and a graph of bloom filters representing data entries in at least one other dataset. Each bloom filter in the data structure (or user bloom filter) represents, as a whole, all the data entries (with that particular key) in the other dataset from which it was generated in step S501.

The control processor 42 then proceeds to step S555 and compares the user bloom filter with the stored bloom filters to determine an indication of the intersection values for each pair formed of the user's dataset and another dataset represented by a bloom filter. This comprises using the techniques described above in relation to FIG. 18.

At step S556 this intersection (or intersections when multiple other datasets are analysed by way of their respective bloom filter) is output by the control processor 42.

Step S555 (along with S554) represents a "comparison stage" in which the two datasets are actually compared to each other to determine the intersection. This is shown in FIG. 19 as being performed by the control processor 42.

Figure 7:
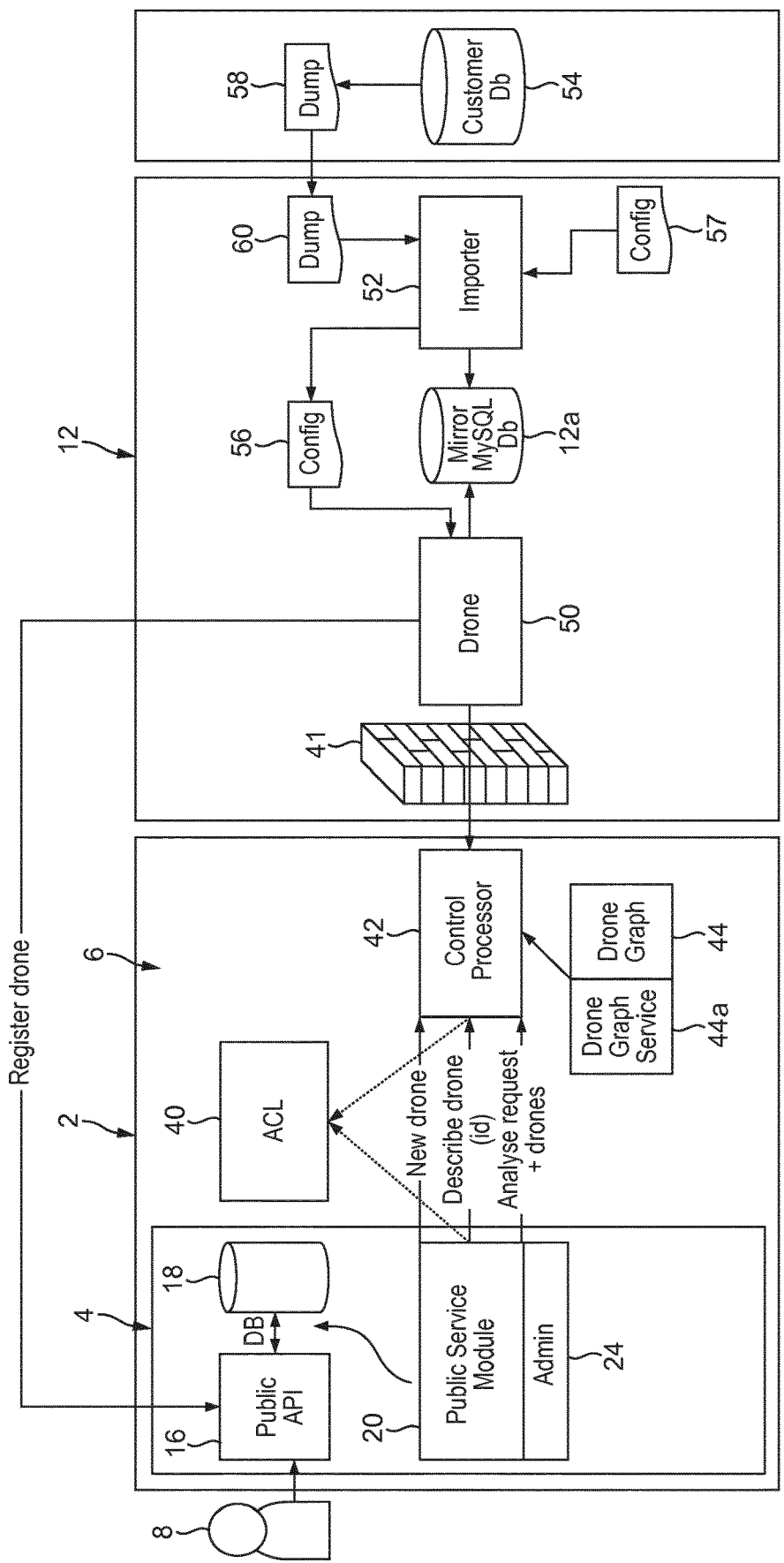
FIG. 7 is a more detailed architectural diagram of a computer system for accessing multiple independent databases.

FIG. 7 is a more detailed architectural diagram illustrating the component at the controller 2 and at a database site 12. The term "database site" is used herein to denote any site where one or more databases may be located. A database may alternatively be referred to herein as a "customer site", indicating that the database is owned by a particular customer. One distinct advantage of the described embodiments is that searches may be done across multiple databases which may be individually owned by different customers. One such database site is shown in FIG. 7. The public part 4 of the controller 2 comprises a public API 16 which is connected to a database 18 and to a public service module 20 which provides an administration interface 24.

The public API enables the user 8 to interact with the system. The administrator interface interact with an access central layer (ACL) components to set up permission, etc. for individual users.

Public parts 4 of the controller communicate with private components within the private part 6. The private components comprise the Access Control Layer (ACL) component 40, a control processor 42, and a control processor memory 47. The access control layer 40 conditions outgoing requests according to the redaction policies of the querying customer and their subscription status. The processor component 42 is responsible for the processing functions which have been described, and for communication with database sites 12. The control processor memory 47 is one or more computer storage devices (e.g. one or more servers) which are accessible by the control processor 42 to perform the steps described above. E.g. the memory 47 may be used by the control processor 42 to store the data structure 600. Each database site comprises a firewall 41 for security purposes. The database site 12 incorporates a database 12a (one of the databases that has already been described). The database 12a is associated with a database agent or drone 50 which is the component which acts to facilitate receipt of queries from the controller 2 and the execution of running those queries over the database 12a.

The database site 12 shown in FIG. 7 has a single database and a single drone. However, there may be a plurality of drones provided for a particular site, each associated with a distinct database. In the present embodiment, there is a 1:1 relationship between drones and databases. The database site 12 comprises an importer module 52. The importer module 52 plays the role of importing data from a "raw" customer database 54 into the database 12a, against which queries can be run. A configuration file 57 can be provided for controlling the operation of the importer. For the sake of completeness, reference numeral 58 denotes a database dump received from the customer database 54, and reference numeral 60 denotes the transfer of that database dump into the database site 12 so that it can be provided to the importer module 52. The configuration file which is supplied to the importer can be manually generated or automatically generated. It defines in particular a set of identifiers which are to be used by the database 12a such that all databases against which queries can be run have at least one common identifiers. This could, for example, be personal information such as a name or email address. In addition, certain items of data to populate the data entries may be required by the configuration file. The importer module 52 supplies a configuration file 56 to the drone 50 to inform the drone about the structure of the database 12a against which queries can be run. An example of the configuration file 56 is given in FIG. 7a.

User requests are handled through the public API via the public service module 20 to the control processor 42. The message "analyse request+drones" in FIG. 7 denotes a request from a user to analyse an input query and to identify the appropriate drones to which the split queries should be sent. New drones can be added by the administration interface 24 of the public service module 20. The drone registration process is described later below.

Figure 20:
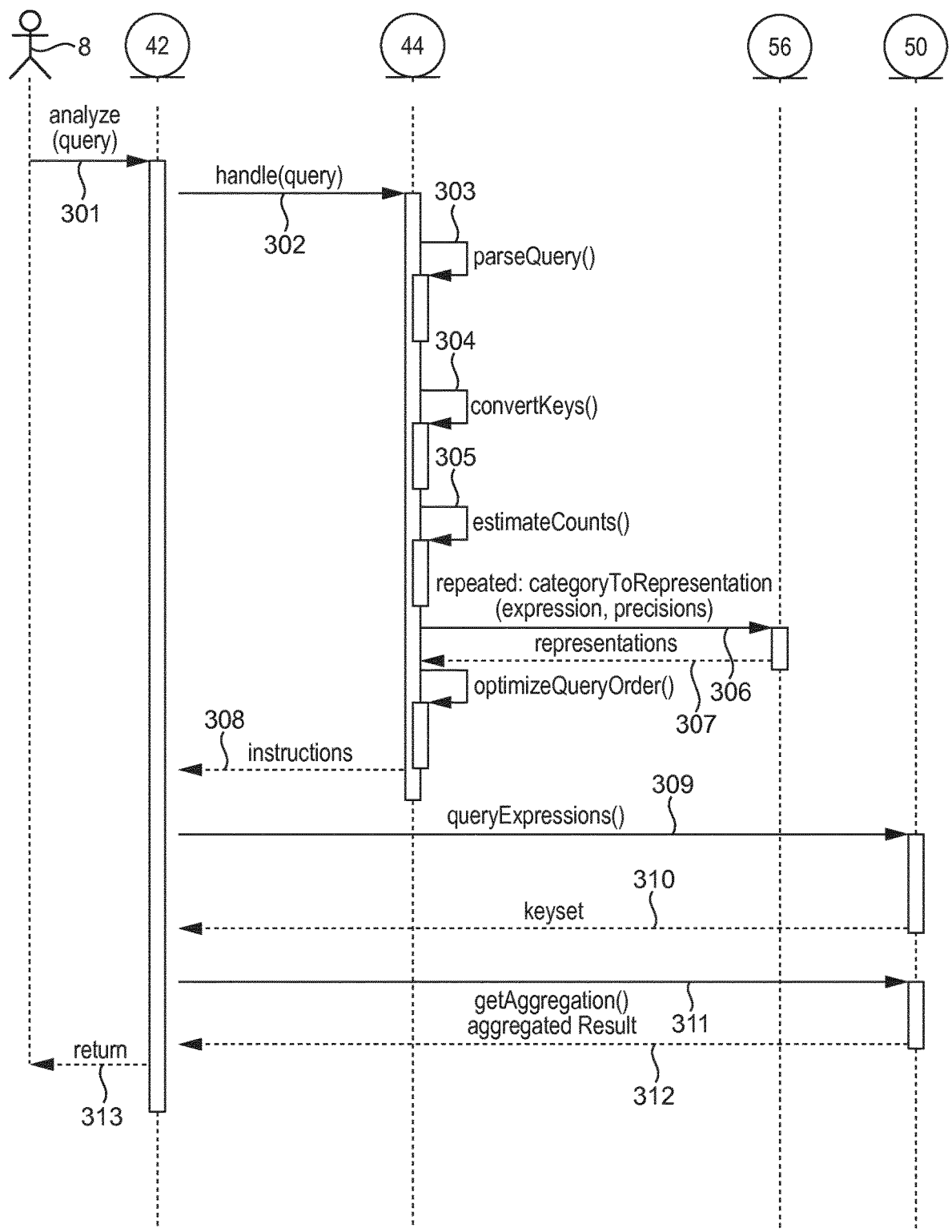
FIG. 20 shows an example overall system architecture.

FIG. 20 shows a diagram illustrating an overview of the flow within the system architecture for applying a query to multiple datasets to return a result. This puts the inventive aspects described in the present application into a broader use context. For example, to run a query for salary data for people aged 41 and above (e.g. salary:age>40): a first dataset having age values but no salary data can be used to identify names (as an example of a key) of people who are older than 40; these names are then provided to a second dataset having salary data but not age values in order to return the salary data of those people previously identified using the first dataset (who are therefore over 40).

The datasets used (the multiple datasets above) can be determined based on intersection data between datasets. For example, respective indications of intersections between a user's dataset and each of a plurality of further datasets may be determined.

A higher intersection means it is more likely that a given entry, as identified by a key such as name, is present in both datasets (i.e. that a given entry from the user's dataset is in the respective further dataset). A further dataset having a higher intersection with the user's dataset than another dataset therefore contains more data entries with keys matching a key from the user's dataset than the other dataset. Therefore, the intersection value(s) may be presented to the user 8 for the user to select which dataset(s) he wishes to run his query over. Alternatively, a dataset pair having the highest intersection may be automatically selected.

When counting filters are used, the user 8 can also be presented with information concerning the "duplication level" of his data entries within the second dataset. That is, not only can the number of data entries in the user's dataset which match (any) entries in the second dataset be determined (a "naïve" intersection value), but also the total number of times each of the data entries matches with an entry in the second dataset (a "gross" intersection value) can be determined. The user may be presented with the gross intersection value, or a difference between the gross intersection and the naïve intersection (thus being an indication of the amount of duplication). For example, the user can be presented with a histogram illustrating the number of data entries in his dataset which match only one entry of the second dataset, the number of data entries in his dataset which match two entries of the second dataset, the number of data entries which match three entries of the second dataset etc.

The query is input, for example by the user 8 entering the query via the public API 16 and received by the control processor 42 with a request 301 to analyse the query. The input query is then analysed to determine one or more datasets to which the query should be applied. This involves analysing the expressions of the query in order to determine at least one dataset having relevant data (e.g. an expression "age>40" requires a dataset comprising age data).

The analysed query is then passed to a drone graph service 44*a* with a request 302 to handle the query. The drone graph service 44*a* comprises the drone graph 44 enabled with some processing functionality. That is, the drone graph service 44*a* comprises the drone graph 44 and a processor (not shown) for performing operations on the drone graph 44 (e.g. create, read, update, delete operations) including at least those described herein.

The drone graph service 44*a* parses the query—303 (this may be performed by a dedicated parser separate from the processor). After parsing the query, the drone graph 44 itself is used by the processor of the drone graph service 44*a* to convert 304 keys of one dataset into a type recognisable by the other dataset (e.g. if the first dataset uses names of people and the second dataset uses email addresses, then an intermediate mapping entity storing associations between names and email addresses is used to either convert names to email addresses of vice versa).

The drone graph service 44*a* then estimates 305 the size of the query based on statistical data about the datasets (e.g. percentiles of numeric values, most common values for text or Boolean values etc.).

In step 306, data categories in the query are analysed by the drone graph service 44*a* to optimise a match between a representation of that category in the query and an available representation in the dataset. The dataset may store data of a particular category according to more than one representation. That is, the configuration file 56 of a particular drone may specify multiple representations of a data value in a certain category, to enable better matching with an input query. The representations which are available are returned 307 to the drone graph service 44*a*. The drone graph service 44*a* selects which representation is to be used based on maximising an expected returned query size. At step 308, the drone graph service 44*a* returns instructions to the control processor 42 to use the selected representation.

The query is then run over this pair of datasets by the control processor 42 using the representation indicated in the instructions of step 308. The first dataset is accessed 309 (represented here by drone 50) using an expression of the query (e.g. age>40) to generate a set of keys ("keyset") being the keys which represent data entries satisfying the expression (e.g. a set of names of people aged over 40 in the first dataset).

This keyset is returned 310 by the drone 50 to the control processor 42 which then provides 311 the keyset and the querying expression to the second dataset (also represented by drone 50 in FIG. 20) to aggregate data entries from the second data set. This comprises the drone of the second dataset determining entries of the second dataset having keys which match a key of the keyset and aggregating the values according to the querying expression. For example, the querying expression may be for salary data in which case the drone 50 aggregates salary data for those people in the second dataset who are identified in the keyset provided in step 311. The result (e.g. salary data for people over 40 years of age) is then returned 312 to the control processor 42 which can then provide 313 the result to the user 8.

There may be circumstances where a dataset comprises multiple separate databases which form a group. As described in our GB Application No 1714655.6, groups may be formed statically or dynamically. It can be helpful in the context of determining intersections for such a group to 'appear' as a single dataset. One mechanism for achieving this is to use a hyperloglog mechanism. The key count of each database within the group can be represented with a set of hyperloglog registers, which can be combined to represent the group as a whole for the purpose of calculating an intersection with another dataset (or group) using the methods outlined above. In addition, the hyperloglog registers allow an approximate calculation of intersections to be accomplished, without having to create a complete model of the group when a new database is added or a new group is created. All that is needed is to generate hyperloglog registers for the new database, or combine existing hyperloglog registers differently to obtain an approximate, quick determination of an intersection.

Drone Registration Process

When a new database is to be added to the system, a new drone 50 is initiated at the location (e.g. customer site) of the database. An administrator at the controller 2 manually instigates a new drone registration process which contacts the new drone to cause the new drone to issue a registration request. The administrator adds a drone and gets a JWT (text) and supplies this text to someone who uses this text at the customer site 12. When the drone starts it sends a request including the JWT to the public API 16. On success the response contains a certificate which the drone needs for communication between 42 and 50, and a drone identifier. Drone identifiers are held in a graph 44 at the controller 2. The graph can be made accessible to customer with access constraints. The drone identifier identifies the drone and its location address to enable queries to be sent to it. Each drone has an association with its database at the customer site. The drone ID also indicates the attributes available to be searched in the database associated with that drone. This could include its bloom filters.

As mentioned above, in the response that is returned to a requesting user, the raw set of data entries which have been identified as a result of the multiple queries executed across multiple databases may be returned. Alternatively, the entries can be aggregated into groups according to attributes of the entries. For example, the groups could comprise statistical bins, each bin containing result entries with attributes in a defined parameter range for that attribute. The aggregated data is supplied to a user.

To increase anonymization (that is to decrease the likelihood of a particular data entry in a sparse set being able to be tied to a particular individual who could be identified) a redaction threshold can be applied of a minimum number of entries per bin. Another redaction threshold for entries in all bins could also or alternatively be applied, e.g. "small" bins can be removed.

As mentioned above, the embodiments described herein enable results across a number of different databases to be returned in response to a single query, in a manner which is "hidden" from a requesting user. Moreover, there is no need to join the records of the databases into a common dataset, so there is no requirement for the databases to be under any kind of common control or ownership.

The databases may be at separate geographical locations. The databases may be at separate IP addresses.

Figure 8A:
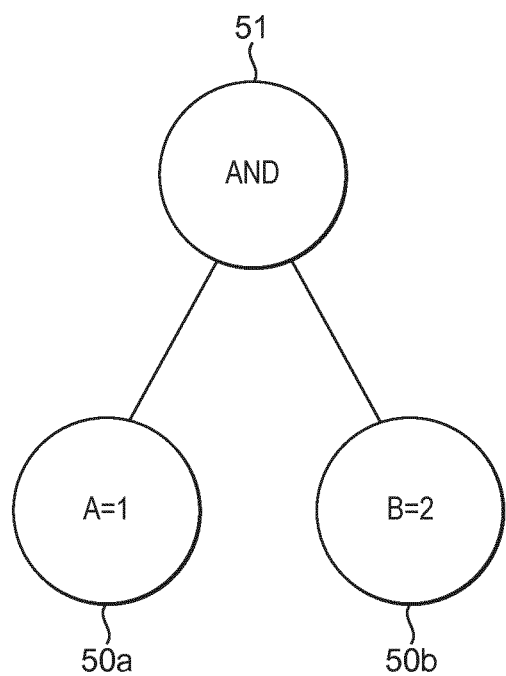
FIG. 8a and FIG. 8b are diagrams illustrating filtering expressions with logical operators.
Figure 8B:
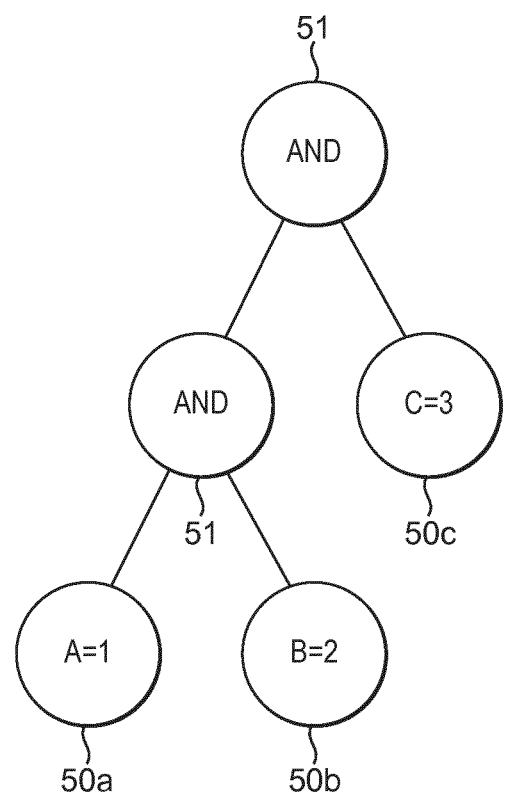
Figure 9:
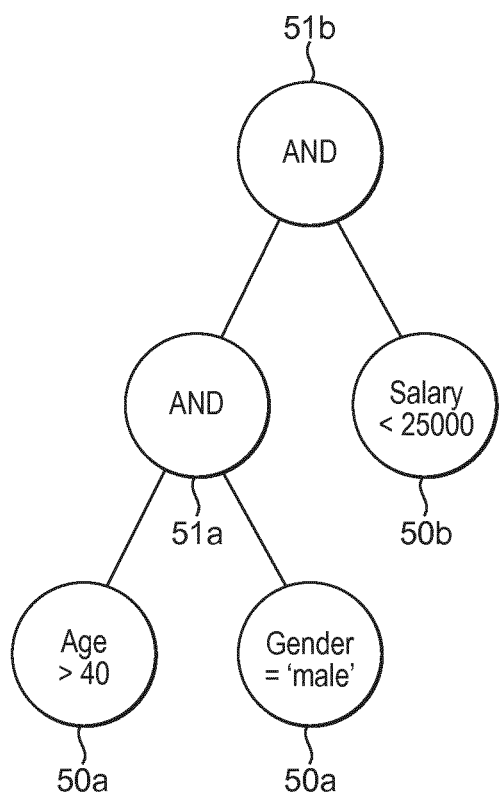
FIG. 9 is a diagram illustrating the process of querying multiple drones with a single joining key.
Figure 10:
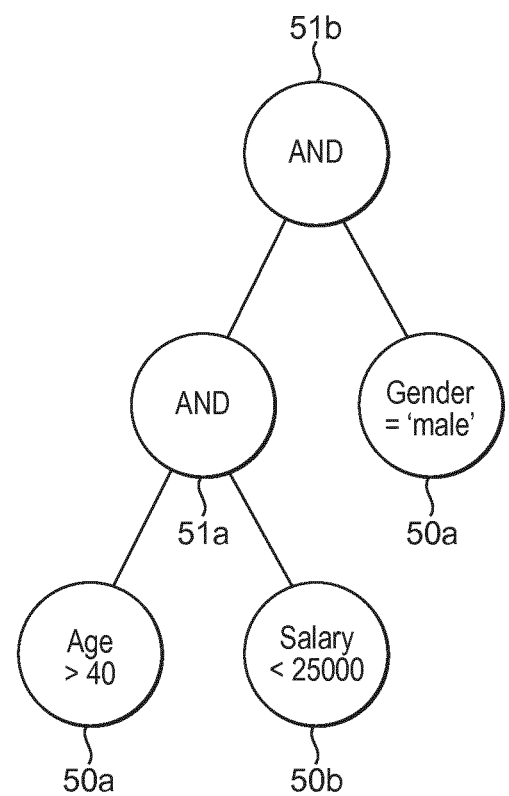
FIG. 10 is a diagram illustrating the process of querying multiple drones with a single joining key.

FIG. 8 to FIG. 10 exemplifies the process of querying multiple drones using a single joining key. For example, a combination of filtering expressions A=1 AND B=2 is shown in FIG. 8a to illustrate the use of an "AND" operator 51 for cross examining returned results at the drones 50a, 50b. Wherein an extra filter expression C=3 at drone 50c can be added and the filtering expressions may be represented as a tree in FIG. 8b, i.e. A=1 AND B=2 AND C=3. Each of the drones 50a, 50b and 50c is appropriated with a respective independent database.

In FIG. 9, the expressions A, B and C in FIG. 11b are replaced with actual filtering expressions (Age>40), (Gender="male") and (salary<25000). In this particular example, drone 50a contains both age and gender information and drone 50b contains salary information. Since the filtering expressions (Age>40) and (Gender="male") are both operable using a common operator (AND) 51a at drone 50a, they can be operated using a single query ("age>40 and gender="male").

In a first scenario where neither drones 50a nor 50b is the target drone, they both count the number of entries fitting their respective filtering expression, as follow, Count ("age>40 and gender="male") in drone 50a; and Count ("salary<25000") in drone 50b;

Assuming the count is relatively lower in drone 50a than that in drone 50b, the two drones then carry out filtering and each returns a filtering set, as follow, Query ("age>40 and gender="male") in drone 50a and return filtering ID set S1; and Query ("salary<25000" and filtering set ID set 1) in drone 50b and return filtering ID set S2 which returns a filtering ID set S2 at most the same amount of elements than in the filtering ID set S1.

The return filtering ID set S2, which has a higher count, is then sent to the target drone for generating the distribution.

In a second scenario where drone 50b is the target drone, no counting is required at the drones 50a and 50b, since drone 50b will be used to generate the distribution, e.g. the operation comprising the step of Query ("age>40 and gender="male") in drone 50a to return filtering set S1, and subsequently sending filtering expression ("salary<25000") and said filtering set S1 to drone 50b to generate the distribution.

A third scenario is shown in FIG. 10 where the scenario (A+B) and C is changed to (A+C) and B. The query comprises the filtering expression to "(Age>40 and gender='male') and salary<25000". The process is equivalent to that of the first scenario.

Example queries have the following form:
Target expression WHERE filter expression.

Figure 11:
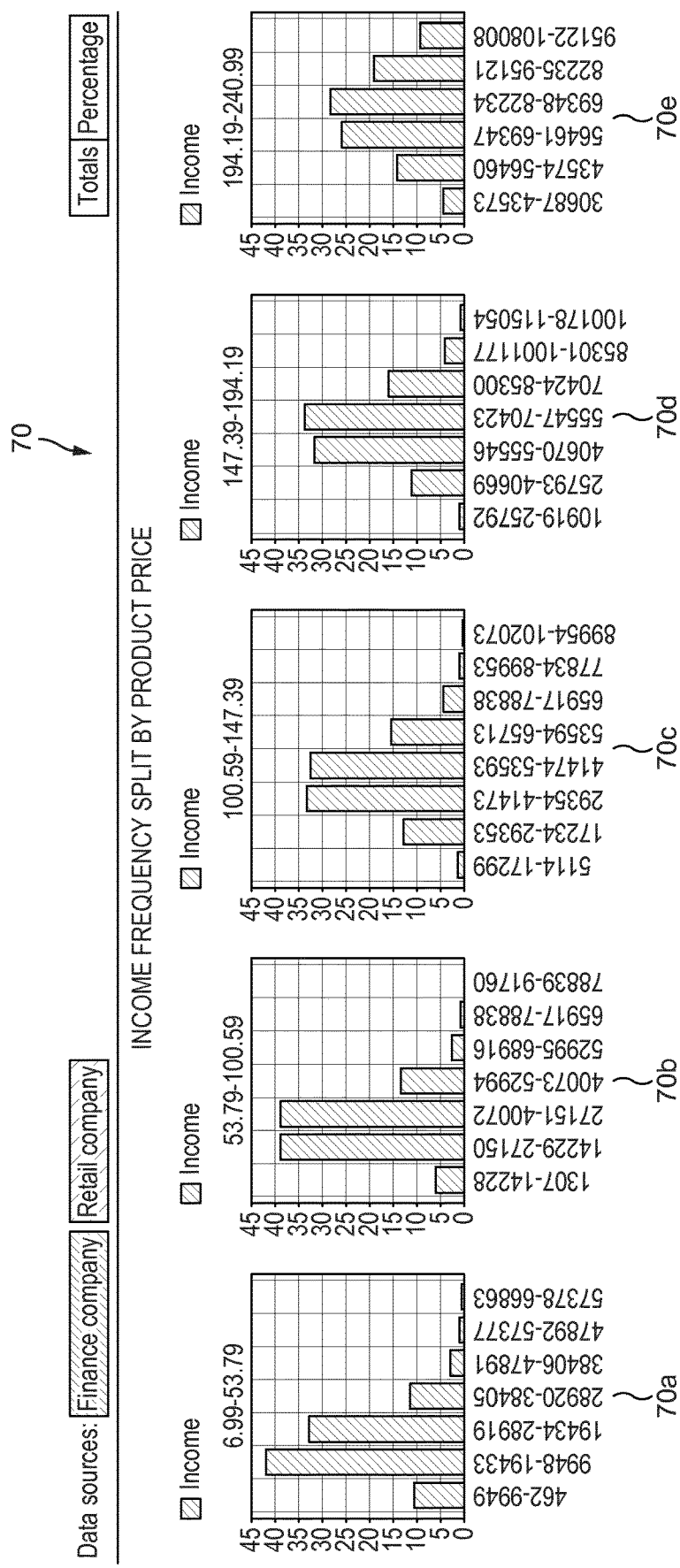
FIG. 11 shows an example output of a user screen.

FIG. 11 shows an example output of a user screen 70 for a user which has requested to join data from a finance company and a retail company.

The query Q1 underlying this is:
Distribution (Income) WHERE Distribution (Product Price)

The data shown in the bar graphs 70a-70e in FIG. 11 is income data which shows the number of people having income in certain ranges derived from a finance company. The numerical range on each bar graph differs and represents a product price range derived from the retail company.

Figure 12:
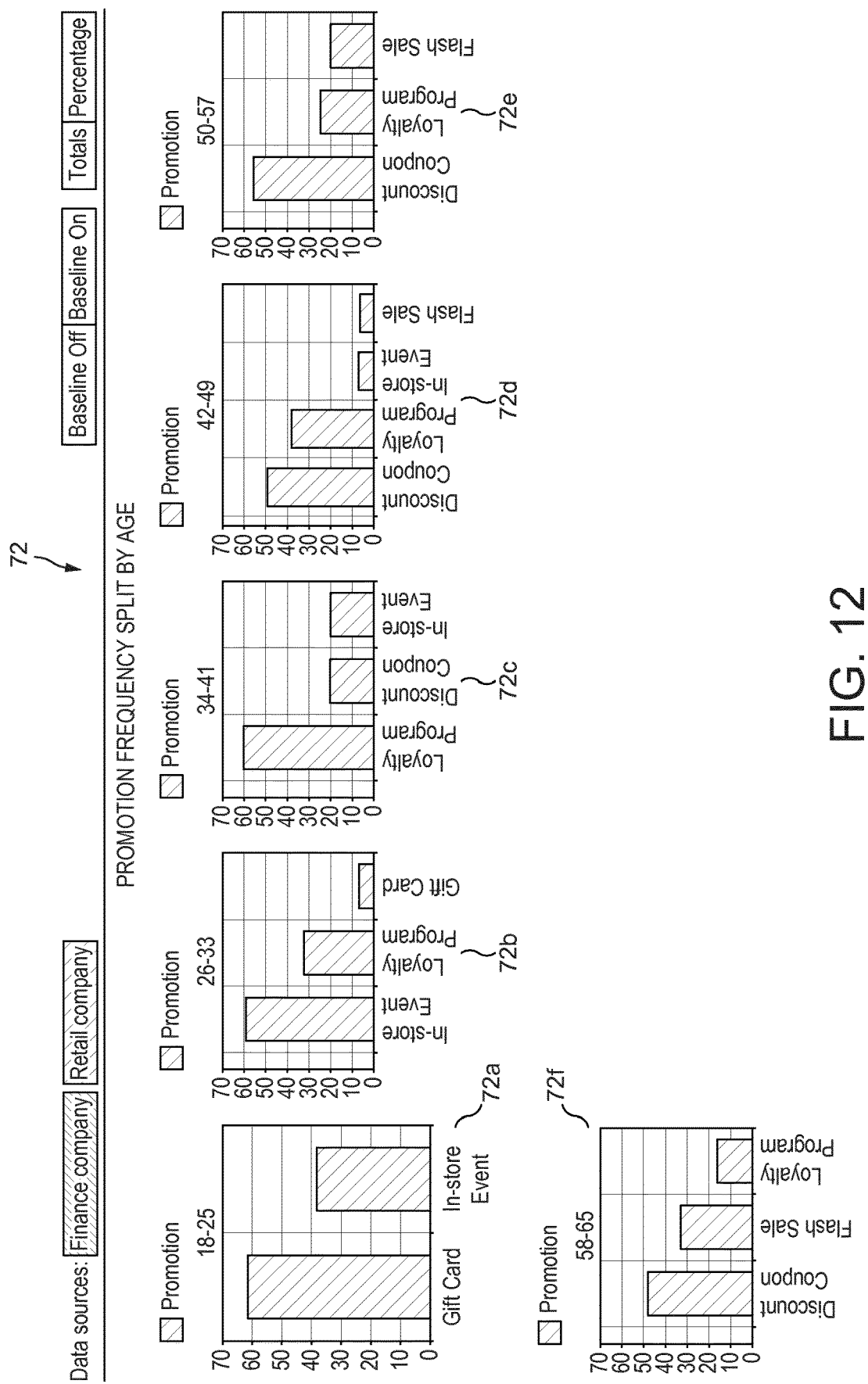
FIG. 12 shows another example output of a user screen.

FIG. 12 shows another example. In this example the data from the finance company indicates numbers of people in certain age range with certain income bracket, which is used to provide different bar graphs 72a-70f from the retail company concerning promotion types.

The query Q2 underlying this is:
Distribution (Promotion) WHERE (Distribution (Age) WHERE income>60000)

Figure 13:
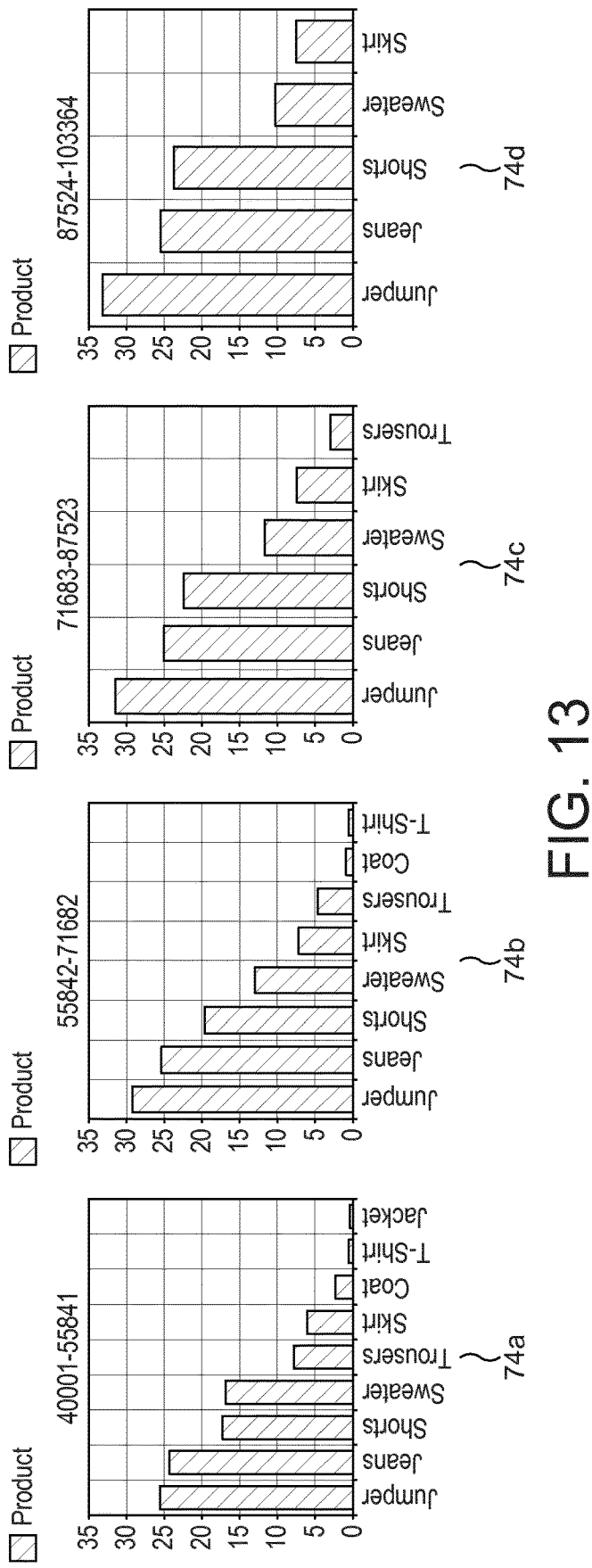
FIG. 13 shows yet another example output of a user screen.

FIG. 13 shows another example where the data from the finance company is used to provide income ranges which are used to generate bar graphs 74a-70d of product frequency from the retail company.

The query Q3 underlying this is:
Distribution (Product) WHERE (Distribution (income) WHERE income>40000 and product_price>80)

Some examples of filter expressions and their use are illustrated in the following table.

| Filter expression | Example use |
| --- | --- |
| Operator (>, >=, =, !=, <, <=) | age > 40, Age >= 40, town = "London" |
| Operator between | age between 25 and 30, town between 'a' and 'b' |
| Operator in | age in (15, 16, 24, 25), postcode in ('RG21 1CE', 'RG21 1CD') |
| Operator like | postcode like 'RG21 %' |
| Negated | Not age > 40 |
| Combined via AND | age > 40 and age > 50, town > 'a' and town < 'b' |
| Combined via OR | age > 60 or age < 15 |

These example filter expressions may be applied to form the following example queries:

distribution(income) where (distribution(gender) where (distribution (age) where job_status!='unemployed')), represents "how is income distributed over genders and ages for not unemployed people".

distribution (private_health_insurance) where (distribution(age) where (distribution(visits_to_doctor) where age>50 and (income>45000 or retired=true))), represents "how many people have a private health insurance when they are over 50 and earn more than £45000 or are retired" The results are split up into 2 groups that is "age" and "visit_to_doctor" group".

sum(purchases) where (distribution(purchase_method) where (distribution(town) where (distribution)purchase_month and purchase_time>'28-10-2015') where age between 18 and 29 and gender='female'", represents "how much money have young females spend on purchases split up in the towns they live in, the month they made the purchase, and the method they used in the last 12 months".

As mentioned above, the importer module 52 defines the identifiers which will be used in common between the databases. Although it may be desirable to have identifiers which uniquely identify particular entries, it is not necessary for implementation of the concept described herein. It is anticipated that there may be errors where identifiers do not uniquely identify an individual entry, for example, customers having the same first and last names, or a single customer having multiple email addresses. However, error rates in aggregation may be acceptable in some cases. If error rates are not acceptable, mechanisms could be put in place to improve the accuracy, or to triage the identifiers to make sure they are unique.

It is noted that different customer databases may adopt different column headers for the same expression, therefore the importer module can be arranged to carry out normalisation on the column headers so as to produce a unified category (or identifier) for a given expression. The normalised data are exported from the "normal" database 54 to the database 12a against which queries will be run, the database 12a constituting an intermediate recipient database for the purpose of running the queries. It is possible to share high level data statistics between the databases once normalisation is finished, or while the database is being normalised. Normalisation can be carried out manually or automatically.

The invention claimed is:

1. A method of determining an indication of an intersection between a first dataset and a second dataset, the method comprising:
    accessing a first dataset holding data entries, each of which is identified by a respective key of a first set of keys, each data entry relating to a respective real-world entity;
    applying, using a processor, a deterministic function to each respective data entry of the first dataset to generate respective first location information;
    encoding the first location information for the data entries in the first dataset into a bloom filter;
    storing the bloom filter having the first location information;
    transmitting the bloom filter to a comparison stage;
    accessing a second dataset holding data entries, each of which is identified by a respective key of a second set of keys, each data entry relating to a respective real-world entity;
    applying, using a processor, the same deterministic function to each respective data entry of the second dataset to generate respective second location information for the data entries in the second dataset; and
    comparing, at the comparison stage, the second location information with the bloom filter to determine the indication of the intersection between the first dataset and the second dataset, the intersection between the first dataset and the second dataset thereby being a number of real-world entities identified in both the first dataset and the second dataset.

2. The method of claim 1, wherein said comparing further comprises determining an indication of a duplication level of entries in the first and second datasets.

3. The method of claim 2, further comprising determining a relationship between the intersection and the duplication level.

4. The method of claim 1, wherein the first dataset is stored at a first computing device and the second dataset is stored at a second computing device.

5. The method of claim 1, comprising the step of storing the bloom filter in a computer store when the first dataset is added to a database access system.

6. The method of claim 5, wherein the step of comparing comprises accessing the bloom filter in the computer store.

7. The method of claim 1, wherein the step of applying the deterministic function to each respective entry of the first dataset or second dataset, and generating the bloom filter, is carried out on the fly each time an indication of the intersection is required.

8. The method of claim 1, when carried out at a controller of a database access system.

9. The method of claim 5, when carried out at a controller of a database access system and wherein the computer store is located at the controller.

10. The method of claim 1, wherein the bloom filter is a counting bloom filter.

11. The method of claim 1, comprising providing in a computer stored data structure an identifier of each of the first and second dataset with an indication of the intersection of the first dataset with the second dataset.

12. The method of claim 8, wherein the comparison stage is located at the controller.

13. The method of claim 1, wherein the bloom filter is a first bloom filter, and further comprising the steps of:
    encoding the second location information for the data entries in the second dataset onto a second bloom filter; and
    transmitting the second bloom filter to the comparison stage.

14. A computer system for determining an indication of an intersection between a first dataset and a second dataset, the computer system comprising at least one hardware processor configured by one or more computer programs to implement the steps of the method of claim 1.

15. The computer system of claim 14, wherein the first dataset is stored at a first computer device and the second dataset is stored at a second computer device.

16. The computer system of claim 14, wherein the at least one processor is located at a controller at a location separate from the first and second devices.

17. The computer system of claim 14, when implementing the method of claim 10 which comprises a computer store holding the data structure.

18. A computer program product comprising a tangible non-transitory computer-readable medium storing computer code which when executed by a processor implements the method of claim 1.

19. A method of determining an indication of an intersection between a first dataset and a second dataset, the method comprising:
    accessing a first dataset holding data entries, each of which is identified by a respective key of a first set of keys, each data entry relating to a respective real-world entity;
    applying, using a processor, a deterministic function to each respective data entry of the first dataset to generate respective first location information;
    encoding the first location information for the data entries in the first dataset onto a binary structure;

storing the binary structure having the first location information;

transmitting the binary structure to a comparison stage;

accessing a second dataset holding data entries, each of which is identified by a respective key of a second set of keys, each data entry relating to a respective real-world entity;

applying, using a processor, the same deterministic function to each respective data entry of the second dataset to generate respective second location information for the data entries in the second dataset; and comparing, at the comparison stage, the second location information with the binary structure to determine the indication of the intersection between the first dataset and the second dataset, the intersection between the first dataset and the second dataset thereby being a number of real-world entities identified in both the first dataset and the second dataset.

20. A method according to claim 19, wherein the binary structure is selected from: a hyperloglog data structure and a Cuckoo Filter.

* * * * *